United States Patent
Bleckat et al.

(10) Patent No.: US 11,835,081 B2
(45) Date of Patent: Dec. 5, 2023

(54) CONNECTING APPARATUS FOR RELEASABLY CONNECTING TWO ASSEMBLIES

(71) Applicant: Fidlock GmbH, Hannover (DE)

(72) Inventors: Björn Bleckat, Hannover (DE); Breido Botkus, Hannover (DE); Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 78 days.

(21) Appl. No.: 17/609,802

(22) PCT Filed: Jul. 13, 2020

(86) PCT No.: PCT/EP2020/069800
§ 371 (c)(1),
(2) Date: Nov. 9, 2021

(87) PCT Pub. No.: WO2021/043482
PCT Pub. Date: Mar. 11, 2021

(65) Prior Publication Data
US 2022/0170503 A1    Jun. 2, 2022

(30) Foreign Application Priority Data

Sep. 4, 2019  (DE) .......................... 10 2019 123 714

(51) Int. Cl.
*F16B 47/00* (2006.01)

(52) U.S. Cl.
CPC .................................. *F16B 47/00* (2013.01)

(58) Field of Classification Search
CPC .... F16B 47/00; F16B 5/00; F16B 2001/0035; F16B 1/00; B62J 11/00; F16M 11/041
(Continued)

(56) References Cited

U.S. PATENT DOCUMENTS 2,908,467 A  * 10/1959 Aberer .................... A47J 45/02
29/421.1
5,192,043 A    3/1993 Fa
(Continued)

FOREIGN PATENT DOCUMENTS

CN        101131176 A     2/2008
CN        102705576 A    10/2012
(Continued)

*Primary Examiner* — Muhammad Ijaz
(74) *Attorney, Agent, or Firm* — THE WEBB LAW FIRM

(57) ABSTRACT

A connecting device for releasably connecting two assemblies, having a closure module which is assigned to a first of the assemblies, and has a housing assembly, an adjustment element disposed so as to be adjustable on the housing assembly, and a vacuum element; and an attachment assembly which is assigned to a second of the assemblies. The vacuum element is connectable to the attachment assembly along an attachment direction and in a connected position interacts with the attachment assembly in such a manner that the vacuum element and the attachment assembly, when the closure module and the attachment assembly are stressed relative to one another, are held together by virtue of a vacuum effect between the vacuum element and the attachment assembly. The adjustment element for releasing the vacuum element from the attachment assembly is able to be tilted about different spatial directions in relation to the housing assembly.

16 Claims, 29 Drawing Sheets

(58) Field of Classification Search
USPC ...... 248/467, 683, 537, 205.5, 205.8, 206.2,
248/206.3, 309.3, 362, 363
See application file for complete search history.

(56) References Cited

U.S. PATENT DOCUMENTS

| | | | |
|---|---|---|---|
| 5,381,990 | A | 1/1995 | Belokin et al. |
| 5,511,752 | A | 4/1996 | Trethewey |
| 5,641,105 | A | 6/1997 | Goto |
| 8,496,222 | B2* | 7/2013 | Li ............... F16B 47/006 |
| | | | 248/205.5 |
| 2005/0168001 | A1* | 8/2005 | Perlman ........... B25J 15/0616 |
| | | | 294/189 |
| 2007/0023594 | A1* | 2/2007 | Choi ............... F16B 47/00 |
| | | | 248/205.5 |
| 2007/0241246 | A1* | 10/2007 | Ristau ............. F16B 47/00 |
| | | | 248/206.2 |
| 2008/0048084 | A1* | 2/2008 | Takahashi ........ F16B 47/00 |
| | | | 248/363 |
| 2008/0210834 | A1 | 9/2008 | Takahashi |
| 2012/0097820 | A1* | 4/2012 | Hajianpour ....... F16B 47/00 |
| | | | 248/363 |
| 2012/0287560 | A1 | 11/2012 | Fan |
| 2013/0323388 | A1 | 12/2013 | Talsma et al. |
| 2015/0330438 | A1* | 11/2015 | Shi .................. F16B 47/006 |
| | | | 248/205.8 |
| 2016/0229352 | A1 | 8/2016 | Zhang |
| 2018/0363689 | A1 | 12/2018 | Richter et al. |
| 2021/0180642 | A1* | 6/2021 | Botkus ............ H01R 13/6205 |
| 2021/0231163 | A1* | 7/2021 | Ditsche ........... F16B 47/00 |

FOREIGN PATENT DOCUMENTS

| | | |
|---|---|---|
| CN | 102778935 A | 11/2012 |
| CN | 103883847 A | 6/2014 |
| CN | 105045345 A | 11/2015 |
| CN | 108431484 A | 8/2018 |
| CN | 209084366 U | 7/2019 |
| EP | 0689966 B1 | 1/1996 |
| JP | S4929371 U | 3/1974 |
| TW | M541535 U | 5/2017 |
| WO | 2019086648 A2 | 5/2019 |

* cited by examiner

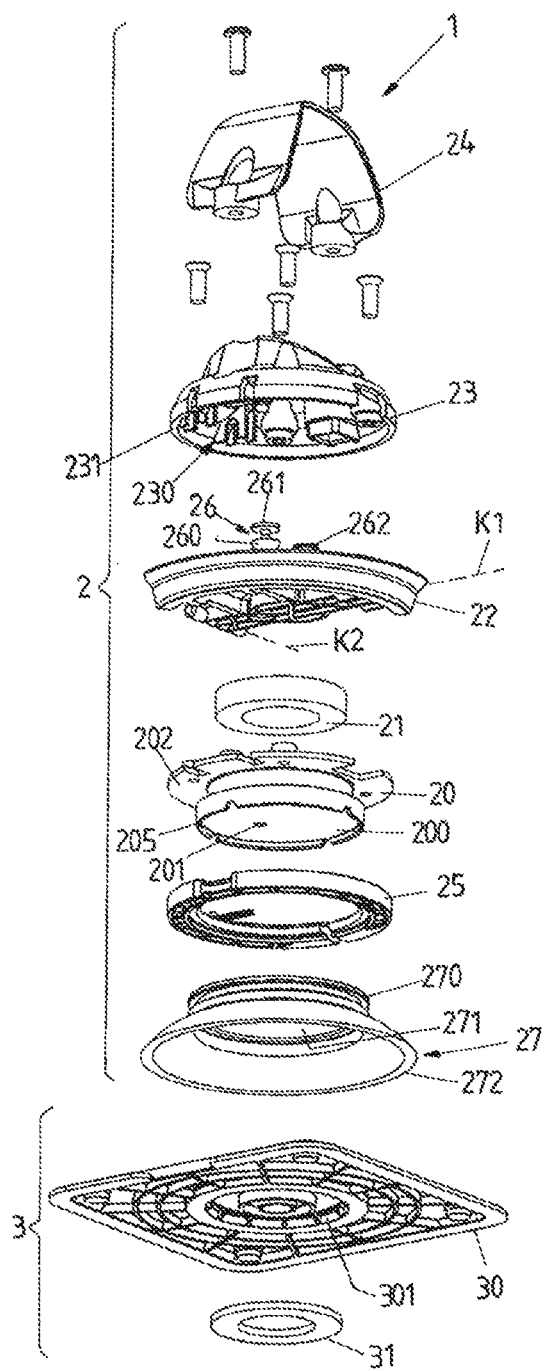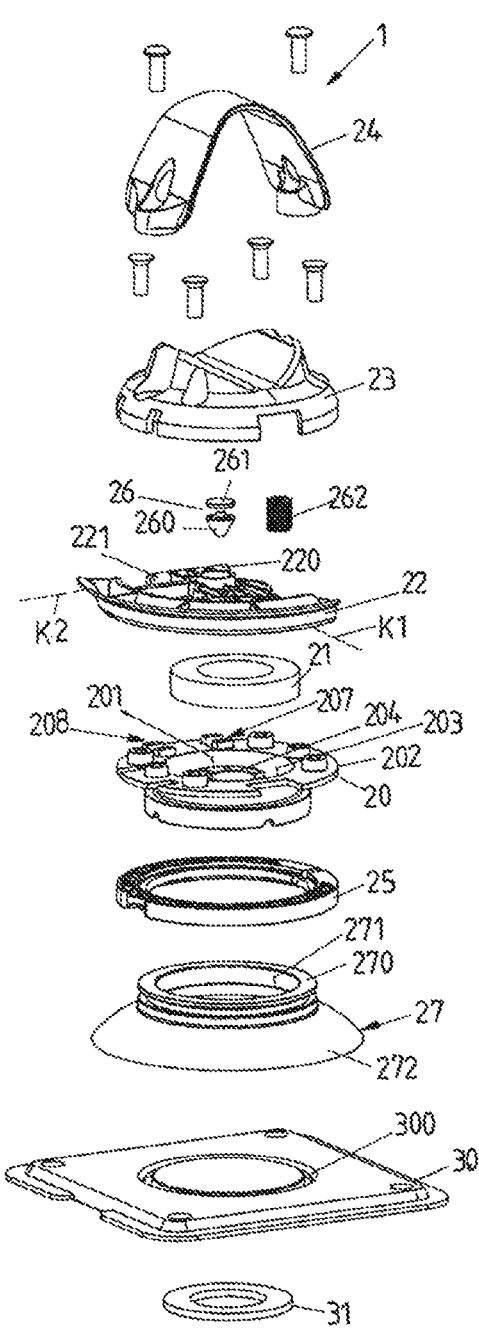

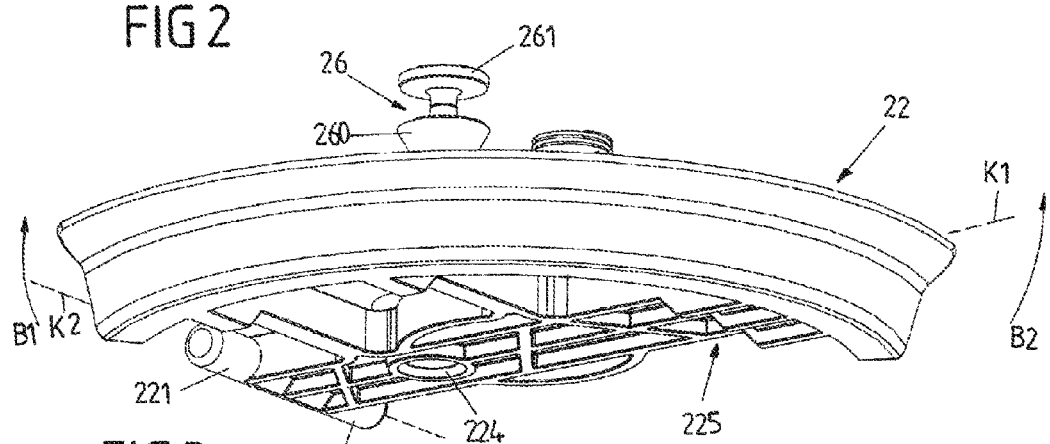
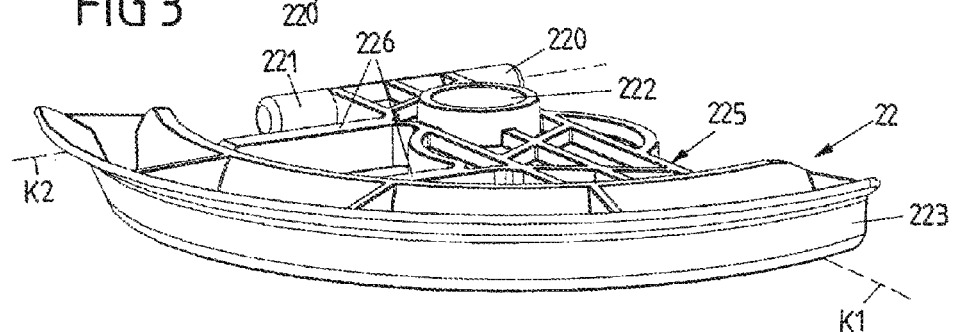
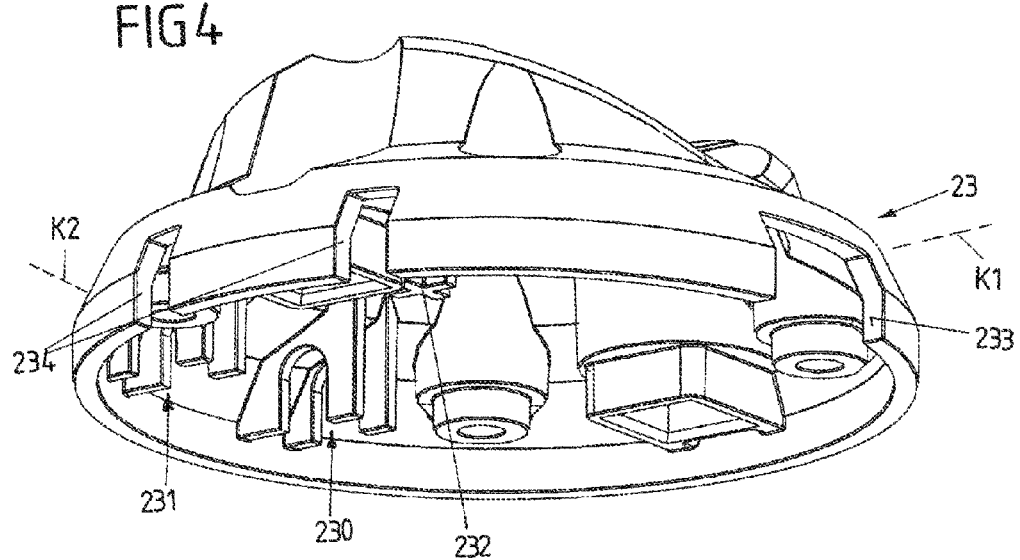

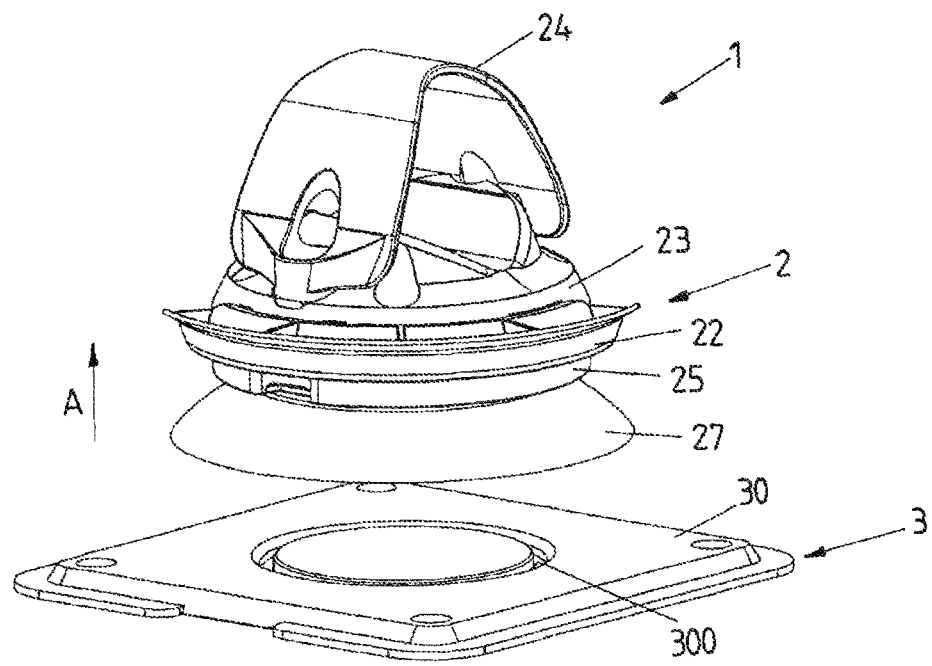
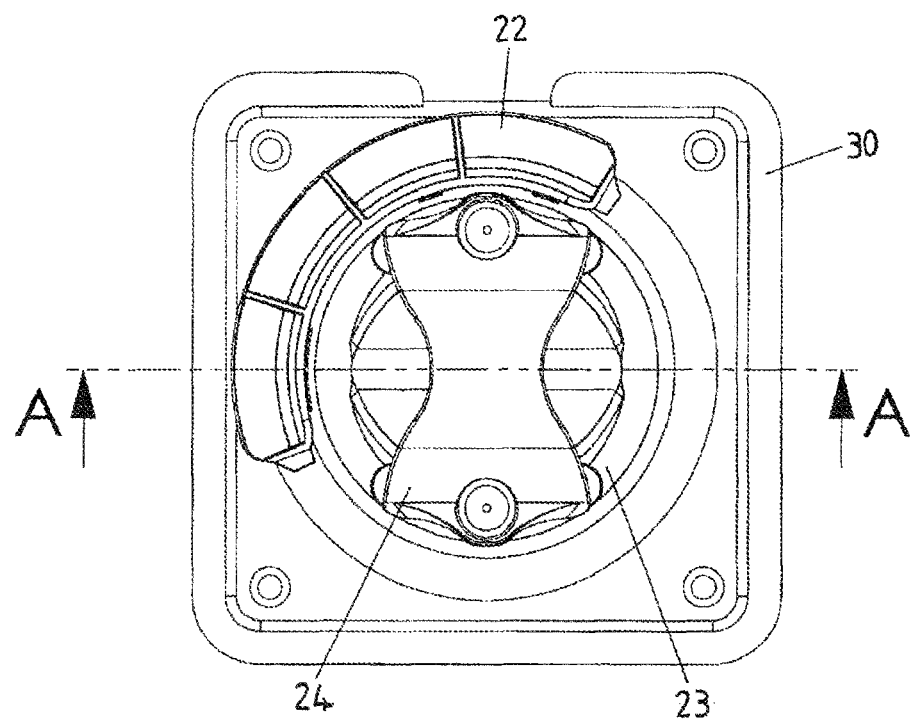

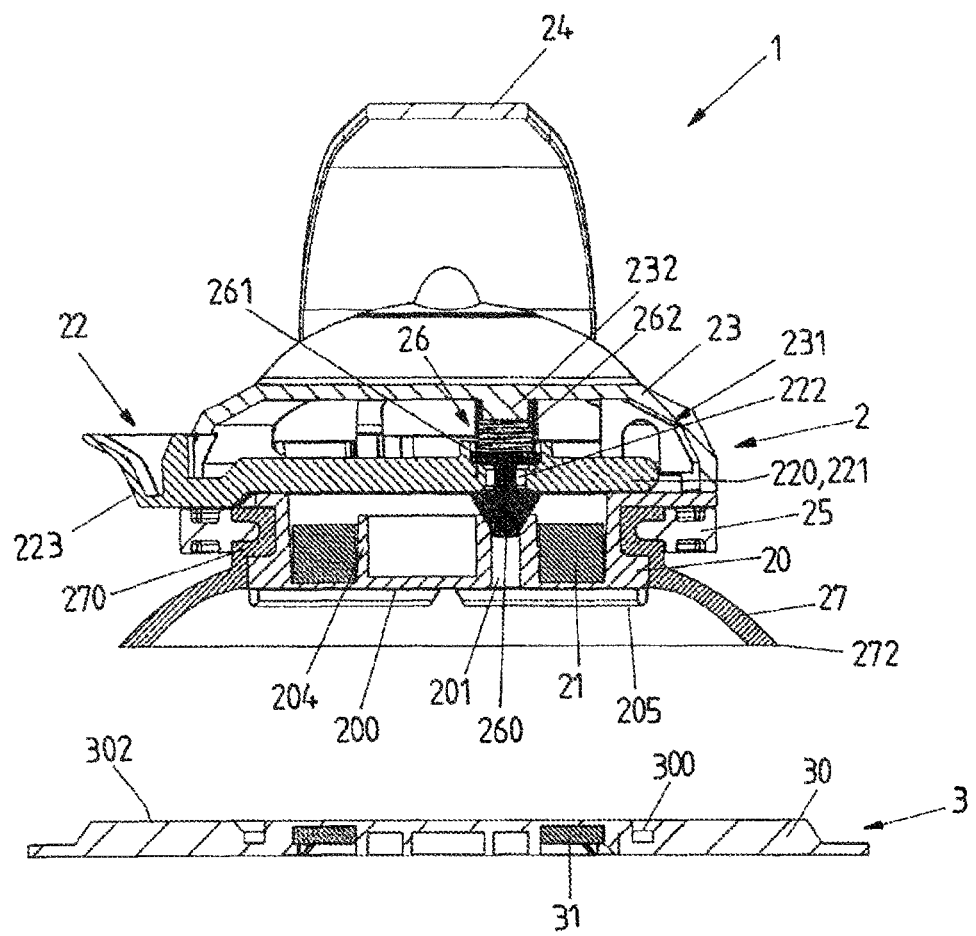

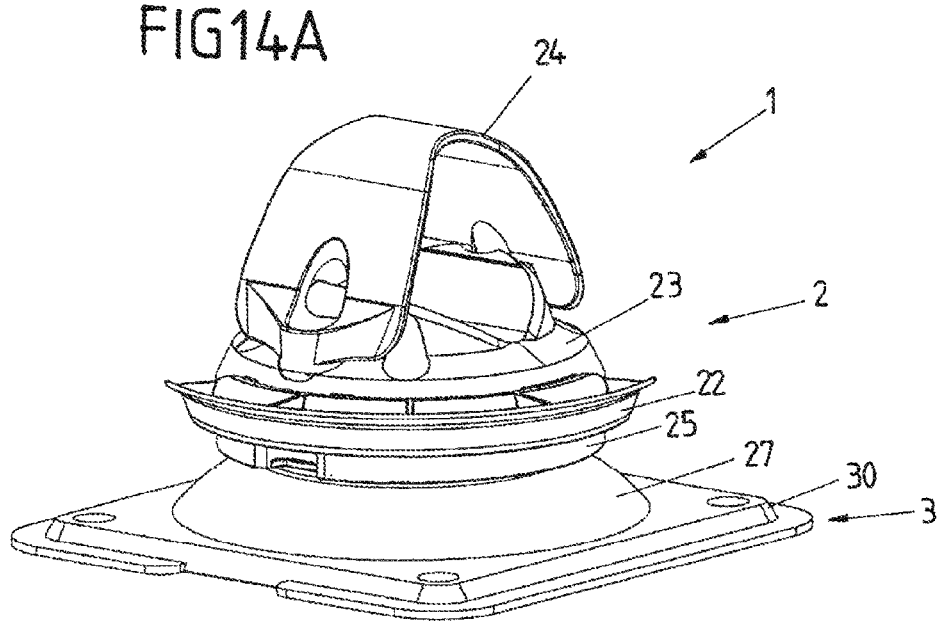
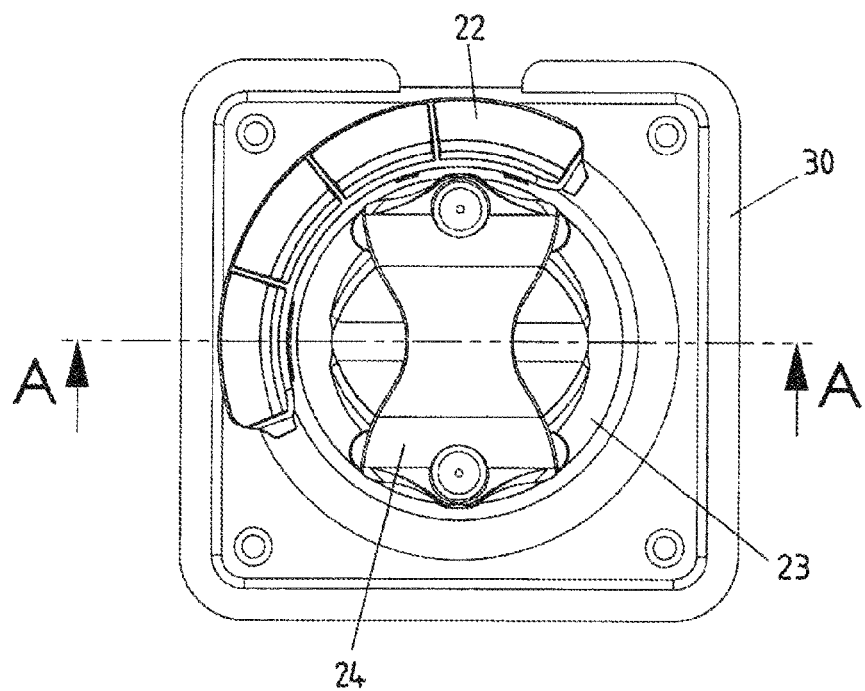

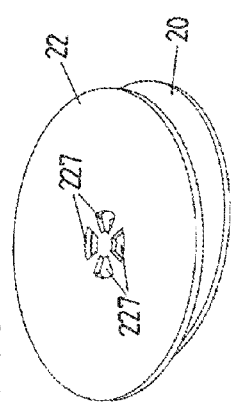
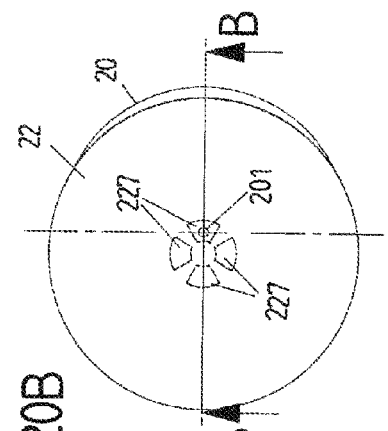
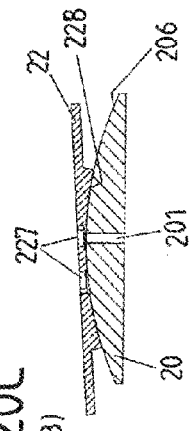
FIG 19A
FIG 19B
FIG 19C (A-A)
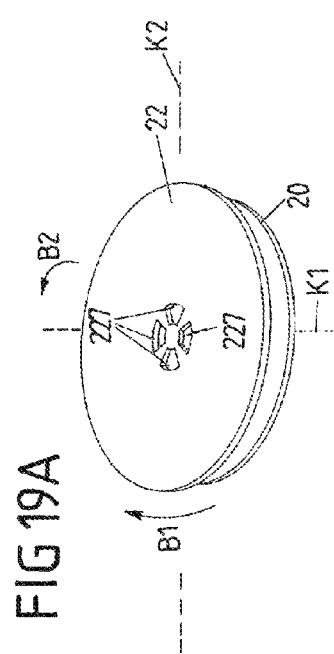
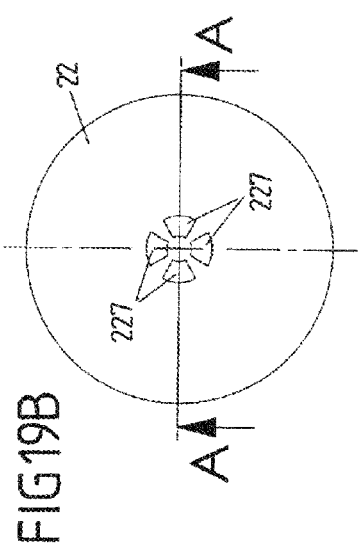
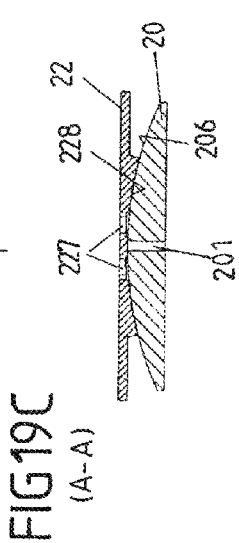
FIG 20A
FIG 20B
FIG 20C (B-B)

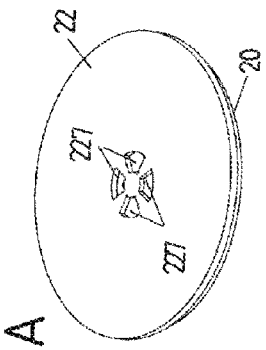
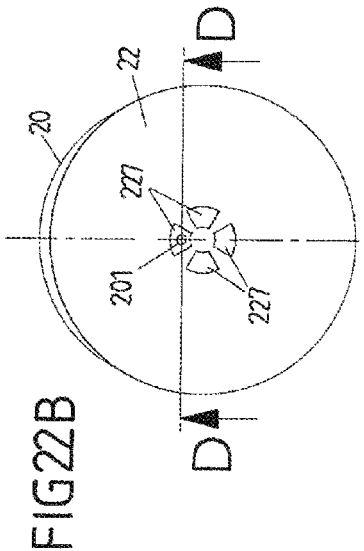
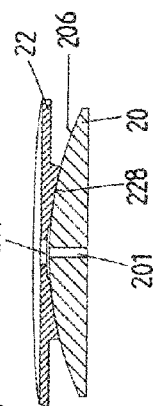
FIG22A
FIG22B
FIG22C (D-D)
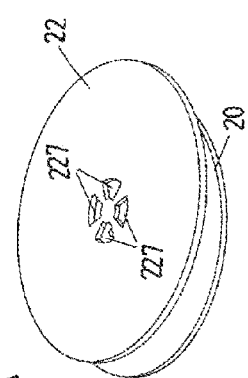
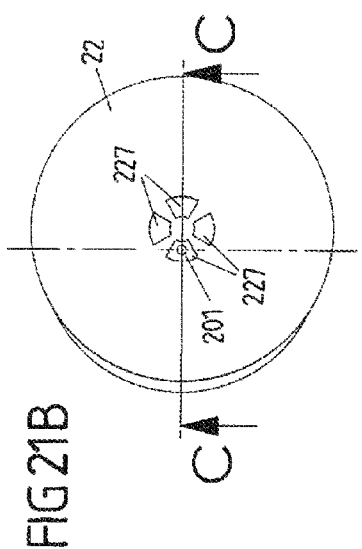
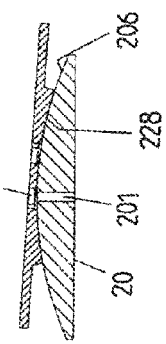
FIG21A
FIG21B
FIG21C (C-C)

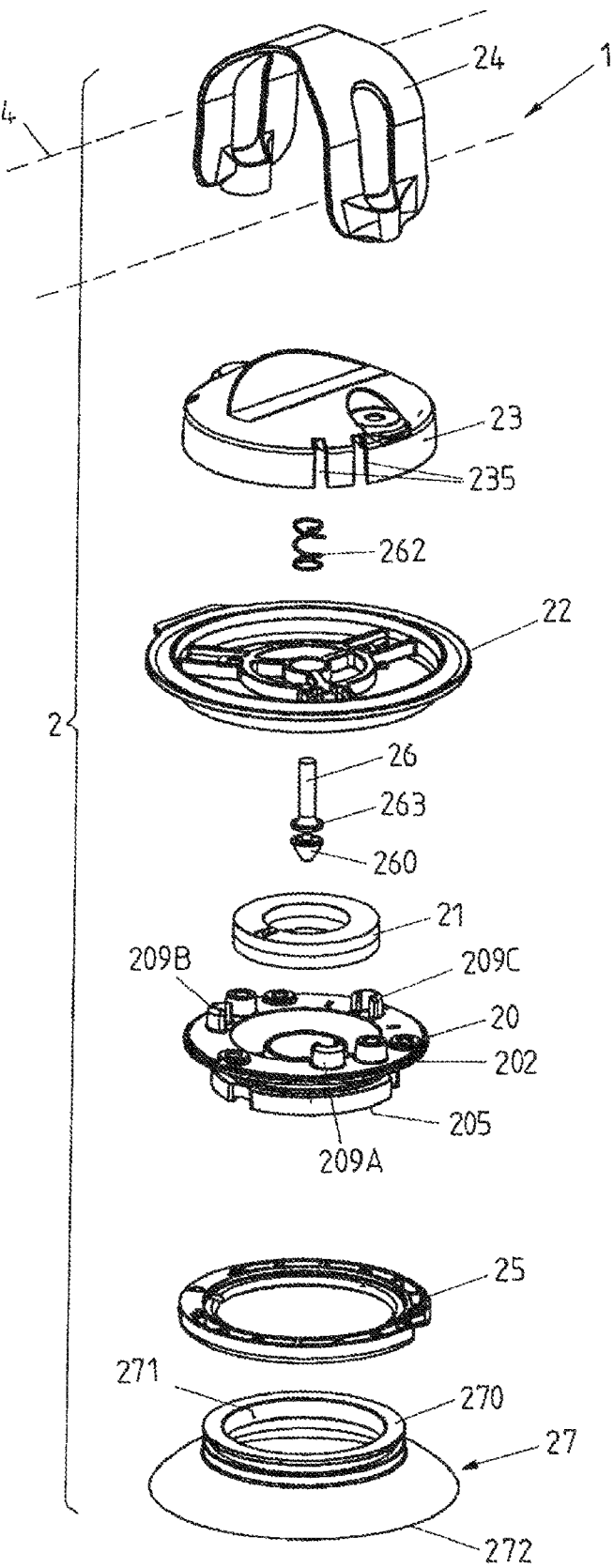

(A-A)

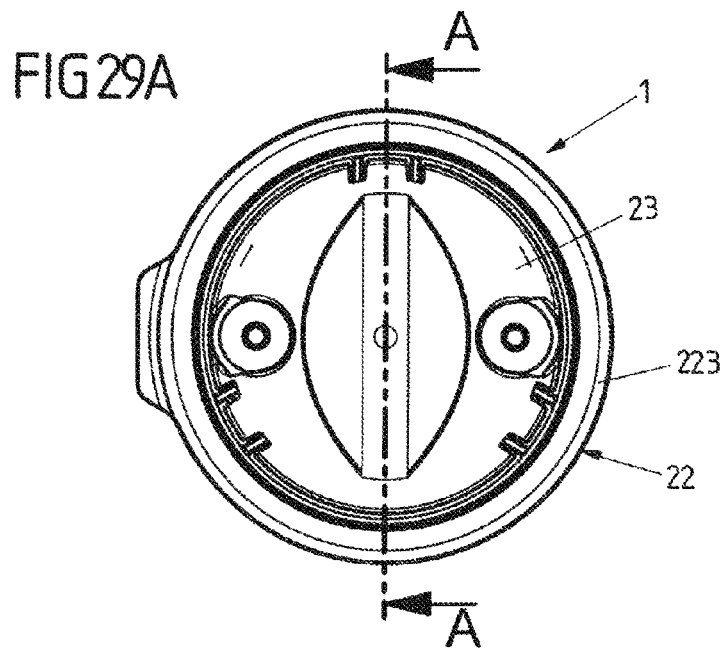
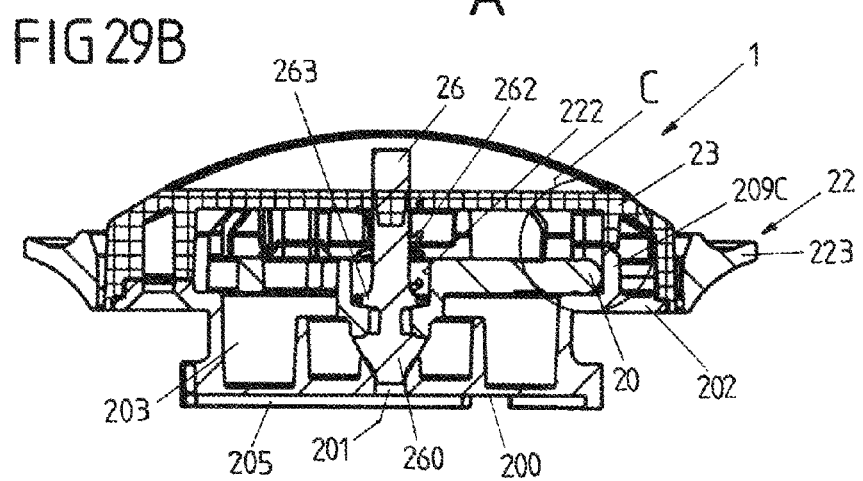
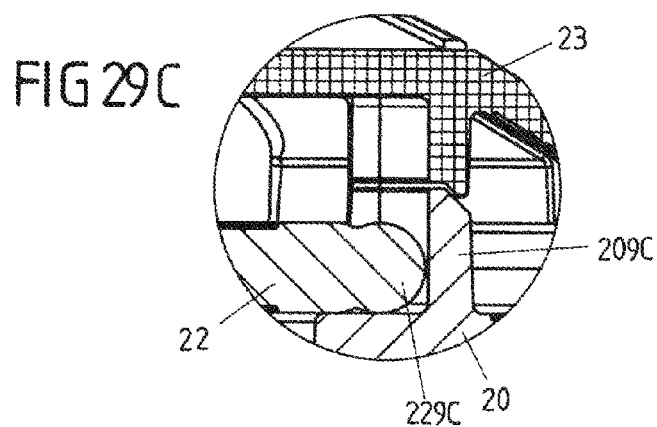

CONNECTING APPARATUS FOR RELEASABLY CONNECTING TWO ASSEMBLIES

CROSS-REFERENCE TO RELATED APPLICATIONS

This application is the United States national phase of International Application No. PCT/EP2020/069800 filed Jul. 13, 2020, and claims priority to German Patent Application No. 10 2019 123 714.9 filed Sep. 4, 2019, the disclosures of which are hereby incorporated by reference in their entirety.

BACKGROUND OF THE INVENTION

Field of the Invention

The disclosure relates to a connecting device for releasably connecting two assemblies.

Description of Related Art

A connecting device of this type has a closure module which is assigned to a first of the assemblies, and has a housing assembly, an adjustment element disposed so as to be adjustable on the housing assembly, and a vacuum element. The connecting device moreover comprises an attachment assembly which is assigned to a second of the assemblies. The vacuum element is connectable to the attachment assembly along an attachment direction and in a connected position interacts with the attachment assembly in such a manner that the vacuum element and the attachment assembly, when the closure module and the attachment assembly are stressed relative to one another, are held together by virtue of a vacuum effect between the vacuum element and the attachment assembly.

A connecting device presently should serve in particular for fastening an electronic apparatus to an assigned assembly. The connecting device can thus enable the fastening of a camera to a helmet (for example a skiing helmet or a cycling helmet) or else the fastening of a mobile phone or any other electronic apparatus in or to a vehicle, for example on the windshield or on the dashboard of a motor vehicle, or on a handlebar of a bicycle or motorcycle.

When a camera is fastened to a helmet, for example a skiing helmet or a cycling helmet, or a mobile phone is fastened to a dashboard of a vehicle or to the handlebar of a bicycle, pulsed impact forces which have to be absorbed and dissipated and in particular should not lead to the camera or the mobile phone being released can thus act when in use. A connecting device for fastening an electronic apparatus, for example a camera or a mobile phone, is therefore to be particularly capable of absorbing briefly acting, pulsed impact forces.

For fastening completely different assemblies to one another, for example also for fastening an electronic apparatus in the form of a mobile phone or a navigation apparatus in a vehicle, connecting devices which provide a mounting by means of vacuum are known. A connecting device which uses a vacuum element in the form of a suction cup so as to establish a mobile phone on the windshield of a vehicle is thus known from US 2013/0323388 A1. To this end, the suction cup is placed onto the windshield, wherein a magnetic element which for improving the adhesion to the windshield can interact with a magnetically acting element on the windshield is disposed on the suction cup.

In a connecting device for fastening an alarm device to a metal surface known from U.S. Pat. No. 5,192,043, a magnetic rubber surface is placed onto a metal surface, wherein a vacuum is created when placing said magnetic rubber surface, such that the alarm device is held on the metal surface as a result of the magnetic action between the rubber surface and the metal surface and by vacuum forces.

A connecting device known from EP 0 689 966 B1 has a magnetic contact plate on which a suction cup is disposed. A ski rack can be fastened to a vehicle roof of a vehicle by means of the connecting device.

Such connecting devices should be easy to lock, on the one hand, so as to establish a connection between the assigned assemblies. It is however moreover also desirable that such connecting devices are also easy to open so as to avoid in particular that said connecting devices are removed with a jerking action while overcoming a vacuum and optionally additionally a magnetic connection.

A connecting device in which a closure module has a vacuum element which can be placed onto an assigned attachment component so as to in a connected position interact with the attachment component by way of a vacuum is known from WO 2019/086648 A2. An adjustment element can be adjusted so as to release a flow opening in order for the closure module to be released from the attachment component.

SUMMARY OF THE INVENTION

It is an object underlying the proposed solution to provide a connecting device which can be easy to use, in particular easy to close, but also easy to open again, while advantageously connecting the assigned assemblies, even under the stress of an impact.

This object is achieved by an adjustment element having features as described herein.

Accordingly, the adjustment element for releasing the vacuum element from the attachment assembly is able to be tilted about different spatial directions in relation to the housing assembly so as to expose a flow opening in the housing assembly for an inflow of air into a space present between the vacuum element and the attachment assembly.

In the connecting device, a connection between the assemblies to be fastened to one another is established in that the closure module assigned to a first of the assemblies and the attachment assembly assigned to the other, second of the assemblies are attached to one another along an attachment direction. A sealed space between the vacuum element and the attachment assembly is created while attaching such that the assemblies are held together by virtue of a vacuum effect. Such a connection can in particular be load-bearing in terms of a shock such that impact forces can be absorbed and dissipated by way of the connecting device.

For example, a camera can be fastened to a helmet, or a mobile phone in or to a vehicle, for example to a windshield or to a dashboard of a motor vehicle, or to a handlebar of a bicycle or motorcycle, by means of the connecting device.

In the connected position of the connecting device, the vacuum element and the attachment assembly can bear on one another in a planar manner, for example, such that there is effectively no space between the vacuum element and the attachment assembly. However, when the assemblies are stressed relative to one another, a force can act on the closure module relative to the attachment assembly, said force acting in the direction of enlarging or achieving a spacing located between the vacuum element and the attachment assembly, this causing a vacuum between the vacuum element and the attachment assembly and thus generating holding forces which hold the vacuum element on the attachment assembly and tend to increase the more intensely the connecting parts are stressed relative to one another. When the closure module is attached to the attachment assembly, the closure module is thus held on the attachment assembly by virtue of the vacuum effect.

The closure module has a flow opening which can be exposed by moving the adjustment element relative to the vacuum element for an inflow of air into a space present between the vacuum element and the attachment assembly. The adjustment element here is adjustable about different spatial directions and thus by different adjustment movements in relation to the housing assembly, this enabling a simple, intuitive, comfortable operation of the adjustment element by a user in order for the closure module and the attachment assembly to be released from one another.

As a result of the adjustment element being able to be tilted about different spatial directions in relation to the housing assembly, the adjustment element can be adjusted in relation to the housing assembly while using different tilting movements and thus be activated for releasing the closure module from the attachment assembly. A superimposed tilting movement, which is composed of tilting about a first tilting axis and a superimposed tilting about a second tilting axis, can also be used here for activating the adjustment element such that a user can act on the adjustment element in entirely different ways and activate the latter in order for the flow opening to be exposed and thus to enable the vacuum element to be released from the attachment assembly.

For example, the adjustment element can be able to be tilted about arbitrary spatial directions within one plane. The adjustment element can thus be mounted on the housing assembly such that tilting of the adjustment element relative to the housing assembly is possible about entirely arbitrary tilting axes, wherein one tilting axis or a plurality of tilting axes can be defined by way of a mechanical bearing, or else free tilting can be possible without any particular, defined tilting axis.

The operation of the adjustment element can preferably take place manually by a user in that the user acts on the adjustment element. The operation of the adjustment element here can take place using the fingertips, for example, in that the user pushes or pulls the adjustment element and, as a result, moves the adjustment element.

As a result of the adjustment element being able to be tilted so as to tumble about different spatial directions, activation by way of gross motor skills, for example while using the palm of the hand or the back of the hand, or optionally also using another part of the body, for example the foot or elbow, is also possible. Because the adjustment element can be moved about different spatial directions, the exact implementation of a specific movement is irrelevant, this enabling a simple, comfortable operation of the connecting device for opening.

The adjustment element here can be embodied with a comparatively large lever (radial in relation to a central axis of the connecting device that is aligned along the attachment direction) such that the adjustment element can be moved with a smooth action.

For example, the adjustment element can have an activation portion which extends along an arc about the attachment direction and has a constant radius in relation to a central axis of the connecting device, for example. For example, the activation portion can describe an angle of more than 90°, for example more than 180°, and can have a comparatively large lever arm in relation to the central axis. For example, the adjustment element by way of the activation portion can transmit radially beyond the housing assembly.

The different spatial directions can define a plane perpendicular to the attachment direction. The different spatial directions here can define (imaginary) tilting axes about which the adjustment element is able to be tilted in the manner of a tumbling movement.

A first tilting axis and a second tilting axis can in particular be directed so as to be mutually perpendicular. The adjustment element when adjusting in relation to the housing assembly can pivot about the first tilting axis, about the second tilting axis, or simultaneously about the first tilting axis and the second tilting axis such that the adjustment element in this way is moved in relation to the housing assembly and a flow opening in the housing assembly is exposed as a result.

The adjustment element in the connected position of the connecting device can assume a first position relative to the vacuum element, for example, in which the flow opening (when viewed from the direction of a space between the vacuum element and the attachment assembly) is closed such that an inflow of air into the space is precluded. From this first position, the adjustment element can be moved to a second position so as to expose the flow opening and enable an inflow of air into a space formed between the vacuum element and the attachment assembly. A vacuum effect between the vacuum element and the attachment assembly thus no longer exists by virtue of the inflow through the flow opening such that the closure module in the absence of a vacuum effect can be removed from the attachment assembly.

In an advantageous design embodiment, the adjustment element is preloaded in the direction of the first position of said adjustment element. The preloading can take place by way of a spring element which acts on the adjustment element, for example. The preloading can however also be effected by way of magnetic elements and thus magnetically, for example. The adjustment element, when not otherwise activated, thus assumes the first position thereof in a self-acting manner and, in particular in the connected position of the connecting device, thus closes the flow opening such that a vacuum effect between the vacuum element and the attachment assembly can be created.

To this end, the closure module preferably has an elastic preloading element, which acts in a mechanically sprung or magnetic manner, for example, and serves for preloading the adjustment element in relation to the housing assembly in the direction of the first position. The adjustment element when adjusting is moved counter to the preloading effect of the preloading element such that the adjustment element upon completion of the activation is reset to the first position thereof in a self-acting manner.

In one design embodiment, the vacuum element is configured by a cup element which is elastic at least in portions. The attachment assembly has an attachment part which configures an attachment face by way of which the vacuum element is connectable so as to connect the assemblies assigned to the closure module and to the attachment assembly to one another. In this case, the vacuum element thus implements a component in the manner of an elastic suction cup which can be disposed on a face of the assigned second assembly so as to, while being elastically deformed, form a vacuum between the vacuum element and the face and as a result provide holding forces for holding the assemblies together.

In one design embodiment, the housing assembly has a first housing part and a second housing part which therebetween receive the adjustment element. A connecting device for connecting to the assigned first assembly, for example for fixedly connecting the closure module to a handlebar of a bicycle, can be realized on one of the housing parts. The housing parts in the assembled position are fixedly connected to one another and therebetween receive the adjustment element in such a manner that the adjustment element can be tilted about different tilting axes in relation to the housing assembly and can thus be activated for releasing the connection between the closure module and the attachment assembly.

In one design embodiment, the housing assembly has at least one bearing point for bearing the adjustment element. The adjustment element here can have at least one bearing journal, for example, which is received in the at least one bearing point of the housing assembly and thus mounts the adjustment element in relation to the housing assembly. The bearing point here is shaped in such a manner that the bearing journal in the bearing point is able to be tilted about the first tilting axis as well as about the second tilting axis such that a superimposed tilting movement of the adjustment element in relation to the housing assembly is enabled.

In one design embodiment, the adjustment element has a plurality of bearing journals and the housing assembly has a plurality of bearing points. The bearing journals are in each case received in one assigned bearing point of the housing assembly. Each of the bearing journals is able to be tilted in the assigned bearing point and is moreover able to be moved along an activation direction along which the adjustment element is adjustable on the housing assembly. A tilting capability of the adjustment element relative to the housing assembly about different spatial directions can be enabled as a result of such a disposal of bearing points, wherein the adjustment element when tilting in relation to the housing assembly can be supported on one or a plurality of the bearing points, the supporting action however differing as a function of the tilting movement. The bearing points can thus predefine different tilting axes about which tilting is possible, wherein tilting in a superimposed manner about different tilting axes may also be possible.

In one design embodiment, the bearing points are lined up next to one another along a circle on the housing assembly. The circle can extend along the plane in which the spatial directions about which the adjustment element of the housing assembly is able to be tilted extend, for example, said plane thus being defined by the spatial directions. The bearing points can be disposed so as to be uniformly distributed along the circle such that the bearing points, in each case in pairs, have an identical mutual spacing. The respective assigned bearing journal can tilt at each bearing point and moreover adjust perpendicularly to the plane of the circle such that tilting of the adjustment element relative to the housing assembly about different spatial directions that extend in the plane of the circle is possible.

For example, three bearing points which are lined up next to one another along the circle can be molded on the housing assembly. Accordingly, three bearing journals which are assigned to the bearing points and supported on the bearing points are molded on the adjustment element.

It is however also conceivable for more than three bearing points, for example four, five, six, or a larger number of bearing points, to be molded on the housing assembly. The adjustment element has a corresponding number of bearing journals.

In one design embodiment, the flow opening is disposed so as to be concentric with the circle on the housing assembly. The flow opening is thus disposed so as to be centric relative to the circle, wherein the flow opening can be offset in relation to the plane of the circle. A valve element can be disposed so as to be concentric with the circle on the adjustment element, said valve element when adjusting the adjustment element being moved conjointly with the adjustment element so as to expose the flow opening and thus release an inflow of air into a space present between the vacuum element and the attachment assembly.

In one design embodiment, the adjustment element has an activation portion for activating the adjustment element by a user, said activation portion having a radius which is larger than the radius of the circle. The activation portion thus extends radially outside the circle along which bearing of the adjustment element on the housing assembly takes place, wherein the activation portion along a circumferential direction can extend circumferentially on the adjustment element, for example, and herein can be closed in an annular manner, or else be composed of a plurality of segments.

An activation of the adjustment element by way of the activation portion takes place in that a user engages on the adjustment element and adjusts the adjustment element in relation to the housing assembly by way of the activation portion. Because the radius of the activation portion, for example measured between the center of the circle and a radial center of gravity of the activation portion at which a user effectively introduces a force into the activation portion in the usual activation according to the intended use, is larger than the radius of the circle on which the bearing takes place, a user can comfortably activate the adjustment element, wherein an activation in different activation directions, in particular also in different directions perpendicular to the plane of the circle, can be possible.

For example, the radius of the activation portion can be more than 5%, preferably more than 10%, furthermore preferably more than 20% larger than the radius of the circle on which the bearing takes place.

For example, the at least one bearing point can be configured by a slot. Such a slot can provide a pivotable bearing about one tilting axis and simultaneously enable tilting about the other one of the tilting axes by way of a longitudinal movement in the slot.

Alternatively, the bearing point can be configured in the manner of a ball-head bearing, for example. In this case, the bearing journal on the adjustment element can be spherically-shaped, for example. An assigned bearing point on the housing assembly receives the bearing journal and supports the latter in such a manner that the bearing journal tilts at the bearing point and can simultaneously be moved perpendicularly to the plane within which the bearing points are disposed on the housing assembly.

In one design embodiment, the flow opening is formed in a base of the housing assembly, said base in the connected position facing the attachment assembly. For example, the base can be molded on a housing part of the housing assembly that is fixedly connected to the vacuum element. The base here can be disposed centrally within the vacuum element and be surrounded by the vacuum element, for example, wherein the base in the connected position points toward the attachment assembly and in the connected position optionally bears in a planar manner on the attachment assembly. In the connected position, the flow opening molded in the base is closed by the adjustment element whereby the flow opening can be exposed by adjusting the adjustment element and air can thus flow into a space present between the base and the attachment assembly so as to cancel a vacuum between the closure module and the attachment assembly and to thus be able to release the closure module and the attachment assembly from one another.

In one design embodiment, the closure module has a valve element which is disposed on the adjustment element and is able to be activated by adjusting the adjustment element. For example, the valve element can be molded from a soft-elastic material, for example a rubber material, and be fastened to the adjustment element such that the valve element in the connected position seals the flow opening on the base of the assigned housing part of the housing assembly, but by adjusting the adjustment element can be moved such that the flow opening is exposed and air can thus flow into a space present between the closure module and the attachment assembly.

In one design embodiment, the valve element has a valve head which in the connected position engages in the flow opening such that the flow opening is closed and is thus sealed in a fluidically tight manner. By adjusting the adjustment element, the valve head can be moved such that a flow opening is exposed and the closure module and the attachment assembly can thus be released from one another.

In one design embodiment, the adjustment element has a first form-fitting portion, and the attachment assembly has a second form-fitting portion. The form-fitting portions when attaching the closure module and the attachment assembly to one another mutually engage in a positive locking manner such that a transverse movement between the closure module and the attachment assembly is blocked. A movement transverse to an attachment direction along which the closure module and the attachment assembly are able to be attached to one another can thus in particular be blocked by means of the form-fitting portions such that forces acting in the transverse direction (thus forces acting in the plane of the attachment face) can be absorbed and supported.

Additionally or alternatively, the closure module in the rotor position thereof in relation to the attachment assembly can be secured such that torsion forces can also be absorbed and supported. To this end, the closure module can have a first engagement portion, while the attachment assembly has a second engagement portion. The engagement portions when attaching the closure module and the attachment assembly to one another mutually engage in a blocking manner and in this way block a rotating movement of the vacuum element in relation to the attachment assembly.

The engagement portions can be formed, for example, by a toothing on the closure module, on the one hand, and a toothing on the attachment assembly, on the other hand (said toothing preferably encircling a circular peripheral portion).

In one embodiment, the closure module has a first magnetic element for magnetically supporting the establishment of the connection of the assemblies to one another. The first magnetic element can be disposed on the housing assembly, for example. Alternatively, the magnetic element can also be disposed on the adjustment element and is thus moved conjointly with the adjustment element.

A second magnetic element can be disposed on the attachment assembly so as to be opposite the first magnetic element.

The magnetic elements of the closure module, on the one hand, and of the attachment assembly, on the other hand, when fitting the connecting parts to one another serve for providing a magnetic pull such that the vacuum is established in a magnetically assisted manner (preferably in a self-acting manner). When fitting the connecting parts, the latter, by virtue of the magnetic interaction, are pulled toward one another in a magnetically attractive manner such that (almost) a vacuum is effected between the vacuum element and the attachment assembly in that the vacuum element configured as an elastic cup element, for example, is pressed against the attachment assembly configuring an attachment face.

The first magnetic element and the second magnetic element can in each case be formed by a permanent magnet or else an arrangement of a plurality of permanent magnets, and for closing the connecting device interact with one another in a magnetically attractive manner in that said permanent magnets point toward one another by way of unlike magnetic poles. It is however also conceivable for one magnetic element to be formed by a permanent magnet or an arrangement of a plurality of permanent magnets while the other magnetic element is formed by a magnetic armature from a ferromagnetic material.

In one design embodiment, the first magnetic element and/or the second magnetic element are/is (in each case) formed by an annular permanent magnet. The first magnetic element and/or the second magnetic element thus extend/extends in an annular manner about the attachment direction, wherein the first magnetic element and the second magnetic element when attaching the closure module and the attachment assembly to one another are opposite one another in a magnetically attractive manner and thus magnetically support the connecting action. As a result of the annular design embodiment, a mutual positioning of the closure module and the attachment assembly while attaching can be facilitated. In particular when the first magnetic element as well as the second magnetic element are in each case formed by an annular permanent magnet, the magnetic elements enable a self-acting positioning of the closure module in relation to the attachment assembly in a plane transverse to the attachment direction such that the closure module and the attachment assembly can be brought to bear on one another in a positionally correct manner in order for the assemblies to be connected.

As a result of the configuration of the first magnetic element and/or of the second magnetic element by (in each case) an annular permanent magnet, an advantageous positioning effect results in that a comparatively minor transverse offset between the magnetic elements has the effect of a comparatively large magnetic transverse force between the magnetic elements. Because the congruence in the radial direction takes place across a comparatively small distance (corresponding to the radial thickness of the annular permanent magnets), the variation in terms of force is comparatively large when the magnetic elements are mutually offset in a radial manner, this having the effect that the magnetic elements in the event of an offset, by virtue of the magnetic pull, are positioned in a self-acting manner such that said magnetic elements are mutually congruent in the transverse direction and thus are opposite one another in a congruent manner.

When the first magnetic element and/or the second magnetic element are/is configured so as to be annular, the first magnetic element and/or the second magnetic element can be closed in an annular manner, or else be opened at one or a plurality of locations in terms of the circumference. In the cross section, the first magnetic element and/or the second magnetic element here can be configured so as to be round, in particular circular, or polygonal, for example quadrangular.

The object is also achieved by a connecting device for releasably connecting two assemblies. The connecting device comprises a closure module which is assigned to a first of the assemblies, and has a housing assembly, an adjustment element disposed so as to be adjustable on the housing assembly, and a vacuum element. The connecting device moreover comprises an attachment assembly which is assigned to a second of the assemblies. The vacuum element is connectable to the attachment assembly along an attachment direction and in a connected position interacts with the attachment assembly in such a manner that the vacuum element and the attachment assembly, when the closure module and the attachment assembly are stressed relative to one another, are held together by virtue of a vacuum effect between the vacuum element and the attachment assembly. The adjustment element for releasing the vacuum element from the attachment assembly is adjustable relative to the housing assembly so as to expose a flow opening in the housing assembly for an inflow of air into a space present between the vacuum element and the attachment assembly. It is provided here that the closure module has a first magnetic element, and the attachment assembly has a second magnetic element, wherein the first magnetic element and the second magnetic element in the connected position are opposite one another in a magnetically attractive manner, and the first magnetic element and/or the second magnetic element are/is formed by an annular permanent magnet.

The first magnetic element and/or the second magnetic element thus extend/extends in an annular manner about the attachment direction, wherein the first magnetic element and the second magnetic element when attaching the closure module and the attachment assembly to one another are opposite one another in a magnetically attractive manner and thus magnetically support the connecting. As a result of the annular design embodiment, a mutual positioning of the closure module and the attachment assembly while attaching can be facilitated. In particular, when the first magnetic element as well as the second magnetic element are in each case formed by an annular permanent magnet, the magnetic elements enable a self-acting positioning of the closure module in relation to the attachment assembly in a plane transverse to the attachment direction such that the closure module and the attachment assembly can be brought to bear on one another in a positionally correct manner in order for the assemblies to be connected.

The first magnetic element and/or the second magnetic element are/is configured so as to be annular, wherein the first magnetic element and/or the second magnetic element can be closed in an annular manner or else be opened at one or a plurality of locations in terms of the circumference. In the cross section, the first magnetic element and/or the second magnetic element here can be configured so as to be round, in particular circular, or polygonal, for example quadrangular.

In one design embodiment, the first magnetic element can be disposed on a base of the housing assembly, for example. The flow opening here can be formed radially within the first magnetic element in the base, for example.

A connecting device of this type is able to be combined with the different aspects and design embodiments as described above. Such a connecting device can in particular be designed having an adjustment element which is able to be tilted about different spatial directions relative to the housing assembly, wherein such a connecting device can however also have an adjustment element of another type.

According to a further aspect, a closure module of a connecting device which serves for releasably connecting two assemblies is assigned to a first of the assemblies and is able to be attached to an attachment assembly assigned to a second of the assemblies. The closure module comprises a housing assembly, an adjustment element disposed so as to be adjustable on the housing assembly, and a vacuum element. The vacuum element is connectable to the attachment assembly along an attachment direction and in a connected position is designed to interact with the attachment assembly in such a manner that the vacuum element and the attachment assembly, when the closure module and the attachment assembly are stressed relative to one another, are held together by virtue of a vacuum effect between the vacuum element and the attachment assembly. The adjustment element for releasing the vacuum element from the attachment assembly is adjustable relative to the housing assembly so as to expose a flow opening in the housing assembly for an inflow of air into a space present between the vacuum element and the attachment assembly. The closure module has a first magnetic element which is configured for magnetically interacting with a second magnetic element of the attachment assembly, wherein the first magnetic element is formed by an annular permanent magnet.

Such a closure module can in particular be a component part of a connecting device according to the type described above.

According to a further aspect, an attachment assembly which is suitable for connecting to the closure module of the type described above is connectable to the vacuum element of the closure module along an attachment direction. The attachment assembly has a second magnetic element which is configured for magnetically interacting with the first magnetic element of the closure module, wherein the second magnetic element is formed by an annular permanent magnet.

The attachment assembly can be a component part of a connecting device of the type described above.

The object is also achieved by a connecting device for releasably connecting two assemblies to one another, said connecting device having a closure module and an attachment assembly. The closure module is assigned to a first of the assemblies and has a housing assembly, an adjustment element disposed so as to be adjustable on the housing assembly, and a vacuum element. The attachment assembly is assigned to a second of the assemblies. The vacuum element is connectable to the attachment assembly along an attachment direction and in a connected position interacts with the attachment assembly in such a manner that the vacuum element and the attachment assembly, when the closure module and the attachment assembly are stressed relative to one another, are held together by virtue of a vacuum effect between the vacuum element and the attachment assembly. The adjustment element for releasing the vacuum element from the attachment assembly is able to be adjusted by a movement counter to a release direction relative to the housing assembly so as to expose a flow opening in the housing assembly for an inflow of air into a space present between the vacuum element and the attachment assembly, wherein the attachment assembly after releasing the vacuum element is removable from the closure module in the release direction.

The operation of the adjustment element can preferably take place manually by a user in that the user acts on the adjustment element. The operation of the adjustment element here can take place using the fingertips, for example, in that the user pushes or pulls the adjustment element and, as a result, moves the adjustment element.

As a result of the adjustment element being able to be tilted so as to tumble about different spatial directions, activation by way of gross motor skills, for example while using the palm of the hand or the back of the hand, or optionally also using another part of the body, for example the foot or elbow, is also possible. Because the adjustment element can be moved about different spatial directions, the exact implementation of a specific movement is irrelevant, this enabling a simple, comfortable operation of the connecting device for opening.

The adjustment element here can be embodied with a comparatively large lever (radial in relation to a central axis of the connecting device that is aligned along the attachment direction) such that the adjustment element can be moved with a smooth action.

For example, the adjustment element can have an activation portion which extends along an arc about the attachment direction and has a constant radius in relation to a central axis of the connecting device, for example. For example, the activation portion can describe an angle of more than 90°, for example more than 180°, and can have a comparatively large lever arm in relation to the central axis. For example, the adjustment element by way of the activation portion can transmit radially beyond the housing assembly.

The adjustment element can also be configured by a lever or a bracket which protrudes radially beyond the housing assembly.

A connecting device of this type is likewise able to be combined with the different aspects and design embodiments as described above. Such a connecting device can in particular be designed having an adjustment element which is able to be tilted about different spatial directions in relation to the housing assembly, wherein such a connecting device can however also have an adjustment element of another type.

For example, the attachment assembly can be connected to an electronic apparatus, for example to a mobile phone holder or the like for holding a mobile phone, and can be removed from the closure module in the release direction so as to release the electronic apparatus from the closure module. As a result of the adjustment element being able to be activated counter to the release direction, a simple releasing and removing procedure in which a user can activate the adjustment element by a hand movement and upon activation can remove the attachment assembly from the closure module is obtained.

The connecting device is configured for fastening an electronic apparatus to an assigned assembly, for example. For example, the connecting device can serve for fastening a camera to a helmet, for example to a skiing helmet or a bicycle helmet. In another design embodiment the connecting device can also serve for fastening a mobile phone or a navigation apparatus or any other electronic communication or information apparatus in or to a vehicle, for example to a windshield or to a dashboard of a motor vehicle, or to a handlebar of a bicycle or motorcycle.

The attachment assembly here can be connected to the electronic apparatus, for example, or be configured so as to be integral to the electronic apparatus. It is also conceivable for the attachment assembly to be connected to a mounting for the electronic apparatus, for example to a mobile phone holder for holding a mobile phone, or to be designed so as to be integral to such a mounting.

In one design embodiment, the closure module has one or a plurality of electrical contact elements which serve for electrically contacting one or a plurality of the mating contact elements assigned to the attachment assembly when the closure module in the case of a closed connecting device is attached to the attachment assembly. Beyond a mechanical connection for holding assemblies together, an electrical connection can thus also be established by way of the connecting device, this being potentially advantageous in particular when an electronic apparatus is to be fastened to an assigned assembly by way of the connecting device, for example. In this case, electric currents for an electric supply, for example for charging the electronic apparatus, can be transmitted by way of one or a plurality of electrical contact elements, or a data connection for exchanging data signals can be provided.

BRIEF DESCRIPTION OF THE DRAWINGS

The concept on which the invention is based is to be explained in more detail hereunder by means of the exemplary embodiments illustrated in the figures in which:

The concept on which the solution is based is to be explained in more detail hereunder by means of the exemplary embodiments illustrated in the figures.

FIG. 1A shows an exploded view of an exemplary embodiment of a connecting device for connecting two assemblies to one another;

FIG. 1B shows the exploded views according to FIG. 1A from another perspective;

FIG. 2 shows an enlarged view of an adjustment element of a closure module of the connecting device;

FIG. 3 shows another view of the adjustment element;

FIG. 4 shows an enlarged view of a housing part of the closure module of the connecting device;

FIG. 13A shows a view of the connecting device in the opened position;

FIG. 13B shows a plan view of the arrangement according to FIG. 13A;

FIG. 13C shows a sectional view along the line A-A according to FIG. 13B;

FIG. 19A shows a view of a generalized exemplary embodiment of a closure module having an adjustment element movable relative to a housing part;

FIG. 19B shows a plan view of the arrangement according to FIG. 19A;

FIG. 19C shows a sectional view along the line A-A according to FIG. 19B;

FIG. 20A shows a view of the arrangement according to FIG. 19A in a tilted position;

FIG. 20B shows a plan view of the arrangement according to FIG. 20A;

FIG. 20C shows a sectional view along the line B-B according to FIG. 20B;

FIG. 21A shows a view of the arrangement according to FIG. 19A in another tilted position;

FIG. 21B shows a plan view of the arrangement according to FIG. 21A;

FIG. 21C shows a sectional view along the line C-C according to FIG. 21B;

FIG. 22A shows a view of the arrangement according to FIG. 19A in another tilted position;

FIG. 22B shows a plan view of the arrangement according to FIG. 22A;

FIG. 22C shows a sectional view along the line D-D according to FIG. 22B;

FIG. 23 shows an exploded view of a further exemplary embodiment of a connecting device;

FIG. 29A shows a plan view of the connecting device;

FIG. 29B shows a sectional view along the line A-A according to FIG. 29A;

FIG. 29C shows an enlarged view in the fragment C according to FIG. 29B;

DESCRIPTION OF THE INVENTION

FIGS. 1A, 1B to 6 show views of an exemplary embodiment of a connecting device 1 which serves for connecting two assemblies to one another.

Figure 5A:
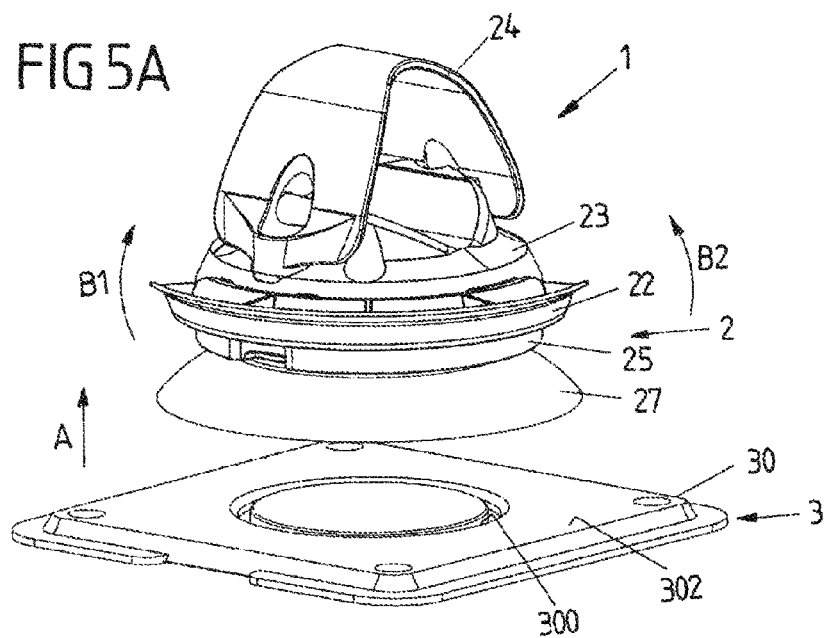
FIG. 5A shows a view of the connecting device in an opened position.
Figure 5B:
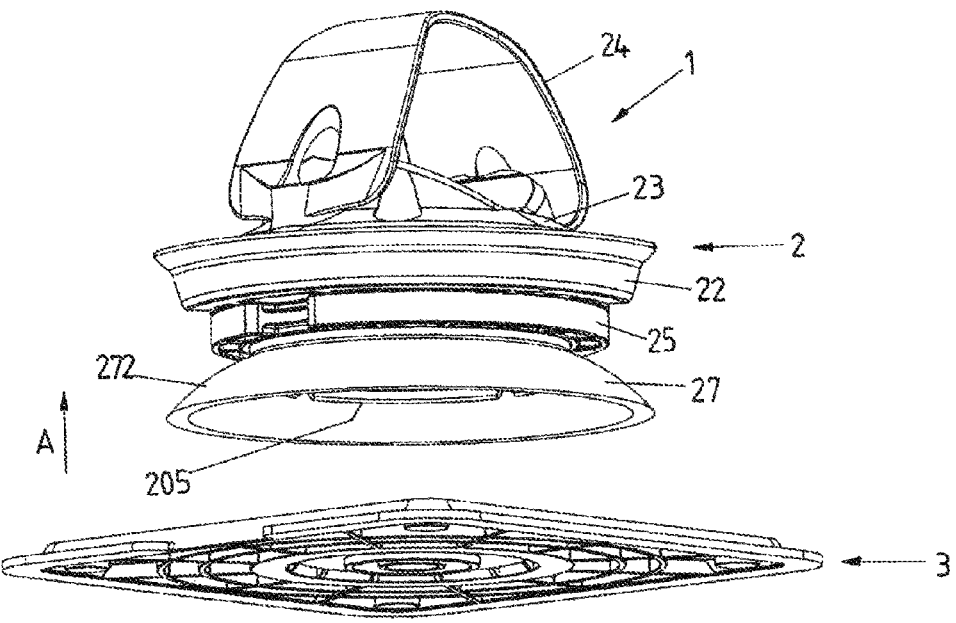
FIG. 5B shows another view of the connecting device.
Figure 6:
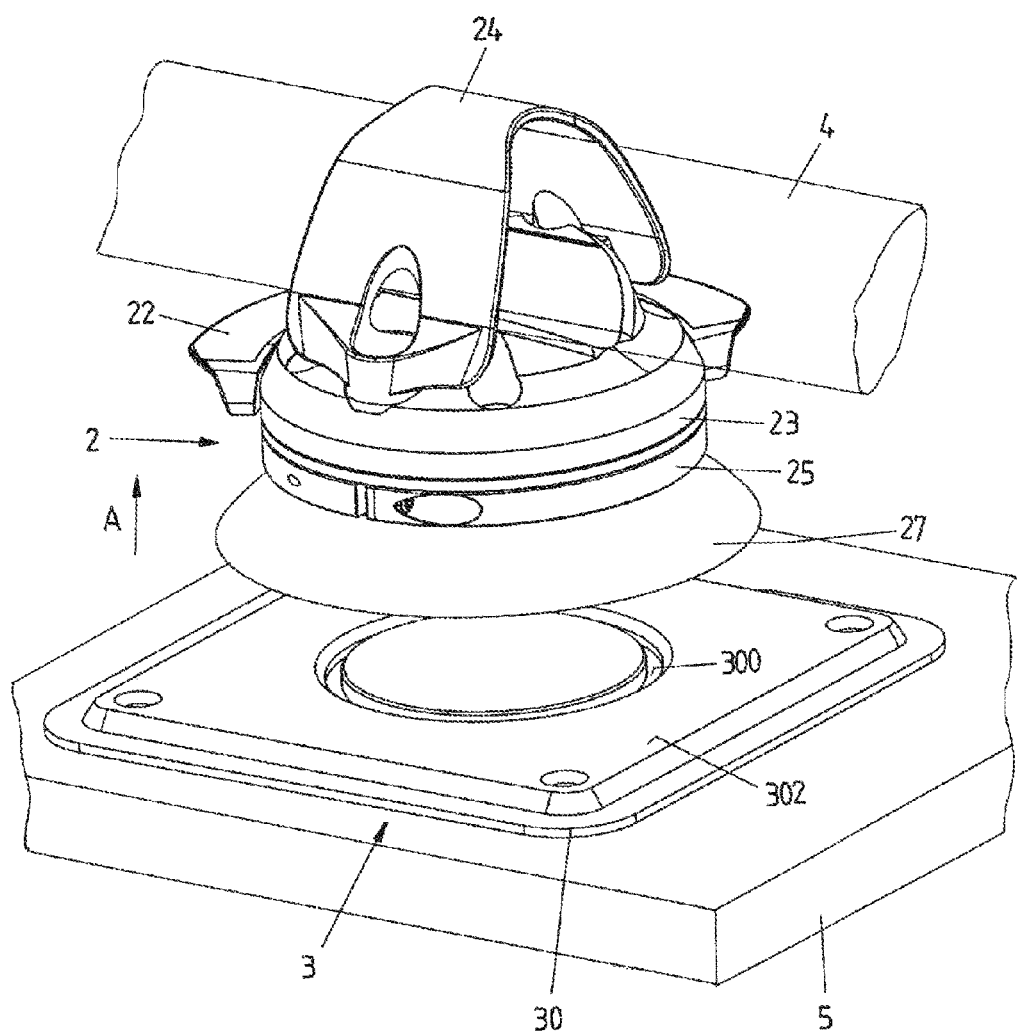
FIG. 6 shows another view of the connecting device in the opened position.

As can be seen from FIG. 6, a first assembly 4 which is fixedly connected to a closure module 2 of the connecting device 1 can be configured by the handlebar of a bicycle or of a motorcycle, for example. A second assembly 5 which is connected to an attachment assembly 3 of the connecting device 1 can in contrast for example be connected by an electric or electronic apparatus, for example a mounting for a mobile phone, such that an electric or electronic apparatus can be fastened to a handlebar, for example, by way of the connecting device 1.

The connecting device 1 has a closure module 2 which comprises two housing parts 20, 23 which are connected to one another and therebetween receive an adjustment element 22. A fastening bracket 24 by way of which the housing assembly formed by the housing parts 20, 23 can be fastened to an assigned assembly 4, for example a handlebar, as can be seen from FIG. 6, is connected to the housing part 23.

The housing part 20, by way of a fastening ring 25 in the form of a clamping ring, is connected to a vacuum element 27 in the form of an elastic element in such a manner that the vacuum element 27 receives the housing part 20 in an opening 271 formed in a collar 270, and by way of a flexible peripheral portion 272 projects radially beyond the collar 270. The housing part 20 here by way of a base 200 lies in the opening 271 and by way of a flange 202 projects radially beyond the collar 270. The housing part 20 is fixedly connected to the housing part 23 by way of the flange 202.

A magnetic element 21 which in the exemplary embodiment illustrated is configured by an annular permanent magnet is received within a receptacle space 203 formed in the housing part 20. The magnetic element 21 surrounds a raised portion 204 within the receptacle space 203 and is disposed within the receptacle space 203 so as to be to the rear of the base 200.

As is yet to be explained hereunder, the closure module 2 by way of the vacuum element 27 can be attached to an attachment part 30 of an attachment assembly 3 so as to establish a connection between the closure module 2 and the attachment assembly 3 in the event of a vacuum effect between the vacuum element 27 and the attachment part 30. The attachment part 30 on one side configures an attachment face 302 to which the vacuum element 27 can be attached by way of the flexible peripheral portion 272, while deforming the vacuum element 27 and while minimizing a space formed between the vacuum element 27 and the attachment part 30, and thus while establishing a vacuum effect between the vacuum element 27 and the attachment part 30.

A magnetic element 31 which in the exemplary embodiment illustrated is configured by an annular permanent magnet and when attaching the closure module 2 to the attachment assembly 3 interact in a magnetically attractive manner with the magnetic element 21 of the closure module 2 so as to magnetically support the closing of the connecting device 1 and to cause a mutual adhesion between the closure module 2 and the attachment assembly 3 is received in a receptacle opening 301 to the rear of the attachment part 30.

As can be seen from the enlarged views according to FIGS. 2 to 4, the adjustment element 22 is received so as to be able to be tilted about different spatial directions between the housing parts 20, 23 and to this end mounted by way of bearing journals 220, 221 on assigned bearing points 207, 208 on the housing part 20 (see FIG. 1B) and bearing points 230, 231 on the housing part 23 (see FIG. 4).

In the exemplary embodiment illustrated, the adjustment element 22 is able to be tilted in particular about different tilting axes K1, K2 in relation to the housing assembly formed by the housing parts 20, 23. The bearing points 207, 208, 230, 231 on the housing parts 20, 23 form a pivot bearing about the tilting axis K2, on the one hand, such that the adjustment element 22 by means of a tilting movement B2 is able to be tilted about the tilting axis K2. Moreover, the bearing points 230, 231 on the housing part 23 configure slots which enable a movement of the bearing journals 220, 221 perpendicular in the bearing points 230, 231 such that the adjustment element 22 is able to be tilted about a further tilting axis K1 in relation to the housing assembly formed by the housing parts 20, 23, said tilting axis K1 being perpendicular to the tilting axis K2.

As a result of the tilting bearing about the mutually perpendicular tilting axes K1, K2, any arbitrary tilting movement about one of the tilting axes K1, K2 or a combination of the tilting axes K1, K2 is possible. A user can thus engage the adjustment element 22 on a circumferentially outer activation portion 223 and tilt the adjustment element 22 in different ways in relation to the housing assembly formed by the housing parts 20, 23 so as to in this way adjust the adjustment element 22 in relation to the housing assembly.

In the exemplary embodiment illustrated, the activation portion 223 extends circumferentially over an angle of approximately 100° on the adjustment element 22. This is however to be understood to be only exemplary. The activation portion 223 can also extend over a larger angle such that an activation of the adjustment element 22 is possible over a larger circumferential angle (for example larger than 180°).

A valve element 26 which is held in a receptacle opening 222 of the adjustment element 22 and by way of a valve head 260 is disposed in the region of an exit 224 of the receptacle opening 222 is disposed on the adjustment element 22, such that the valve head 260 points toward a flow opening 201 in the base 200 of the housing part 20, as is yet to be explained hereunder by means of FIGS. 13A-13C to 18A-18C. The valve element 26 by way of the valve head 260 serves for closing the flow opening 201 in the base 200 of the housing part 20 when the connecting device 1 is situated in the closed, connected position such that a vacuum between the vacuum element 27 and the attachment assembly 30 is maintained. The valve element 26 can be moved relative to the flow opening 201 by adjusting the adjustment element 22 such that the flow opening 201 is entirely or partially exposed and air can thus flow into a space between the vacuum element 27 and the attachment assembly 3, as a result of which a vacuum effect is cancelled and releasing the closure module 2 and the attachment assembly 3 from one another is enabled.

In the exemplary embodiment illustrated, the activation portion 223 is connected to the bearing journals 220, 221 by way of a connecting portion 225, wherein the transverse webs 226 additionally extend between the activation portion 223 and the connecting portion 225. The connecting portion 225 and the transverse webs 226 are received in respective assigned openings 233, 234 on an outer circumferential portion of the housing part 23, as can be seen from FIG. 4, such that the adjustment element 22 is adjustable in relation to the housing part 23.

The adjustment element 22 in the direction of a non-activated closing position is resiliently preloaded in relation to the housing part 23 by way of a spring element 262 supported on a support portion 232 of the housing part 23, said spring element 262 being in the form of a compression spring. The spring element 262 is supported on a foot 261 in the receptacle opening 222 of the adjustment element 22 and holds the adjustment element 22 in such a position in which the valve head 260 engages in a sealing manner in the flow opening 201.

The magnetic elements 21, 31 in the exemplary embodiment illustrated in FIGS. 1A, 1B to 6 are configured by annular permanent magnets. In principle however, very different designs are conceivable and possible here for the magnetic elements 21, 31, as is to be explained hereunder by means of FIGS. 7 to 12.

Figure 7:
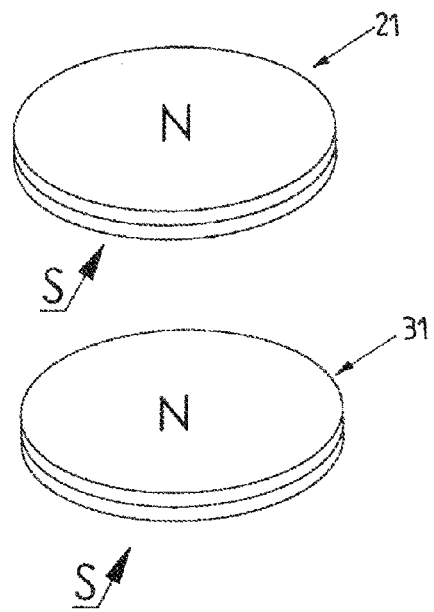
FIG. 7 shows a view of an exemplary embodiment of magnetic elements of the connecting device.

In a first example, illustrated in FIG. 7, the magnetic elements 21, 31 are configured by disk-shaped permanent magnets, wherein the magnetic elements 21, 31 by way of unlike poles (N, S) point toward one another and thus are opposite one another in a magnetically attractive manner so as to magnetically assist the closing of the connecting device 1 and to hold the closure module 2 in the connected position in a magnetically attractive manner on the attachment assembly 3.

Figure 8:
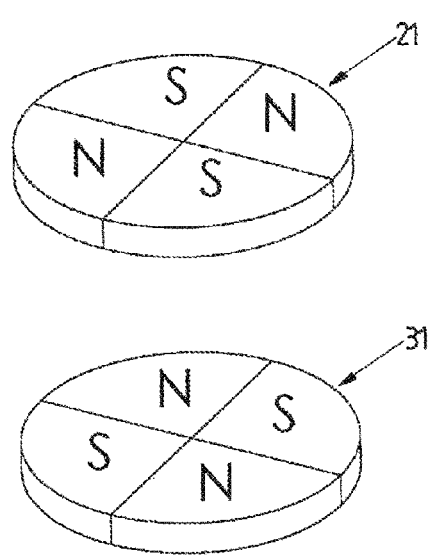
FIG. 8 shows a view of another exemplary embodiment of magnetic elements of the connecting device.

In another design embodiment, illustrated in FIG. 8, the magnetic elements 21, 31 can in each case have a plurality of magnetic poles N, S which are formed by different magnetizing portions on the magnetic elements 21, 31, for example. The magnetic poles N, S here are lined up next to one another in an alternating manner in the circumferential direction.

Figure 9:
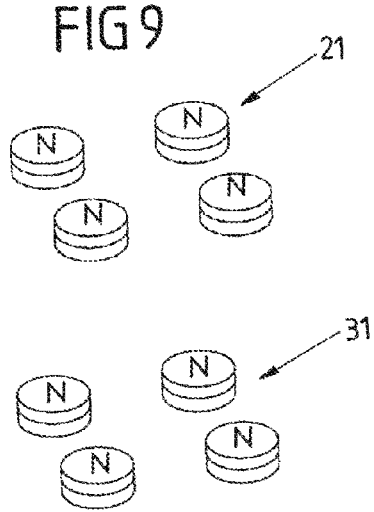
FIG. 9 shows a view of yet again another exemplary embodiment of magnetic elements of the connecting device.
Figure 10:
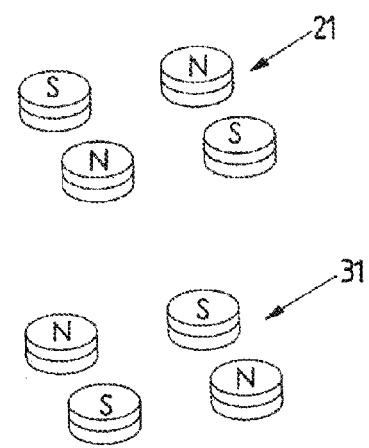
FIG. 10 shows a view of yet another exemplary embodiment of magnetic elements of the connecting device.

FIGS. 9 and 10 show examples of magnetic elements 21, 31 which are formed by arrangements of a plurality of permanent magnets on each side. The permanent magnets on each side here, as in the example according to FIG. 9, can be mutually disposed in identical directions and thus point to the respective other magnetic arrangement by way of identical poles. The permanent magnets on each side here can however also be disposed so as to be mutually rotated and thus point toward the respective other magnetic arrangement by way of alternating poles, as in the example according to FIG. 10.

Figure 11:
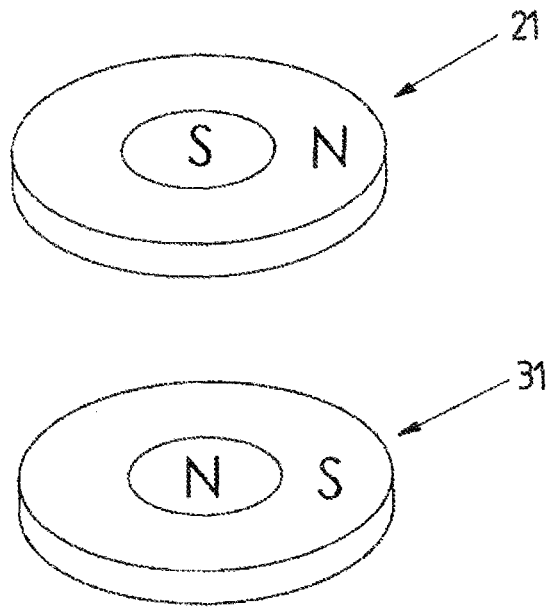
FIG. 11 shows a view of yet another exemplary embodiment of magnetic elements of the connecting device.

In the example according to FIG. 11, one pole N, S is disposed radially outside a further pole S, N on each magnetic element 21, 31. The outer pole N, S surrounds the inner pole S, N in an annular manner.

Figure 12:
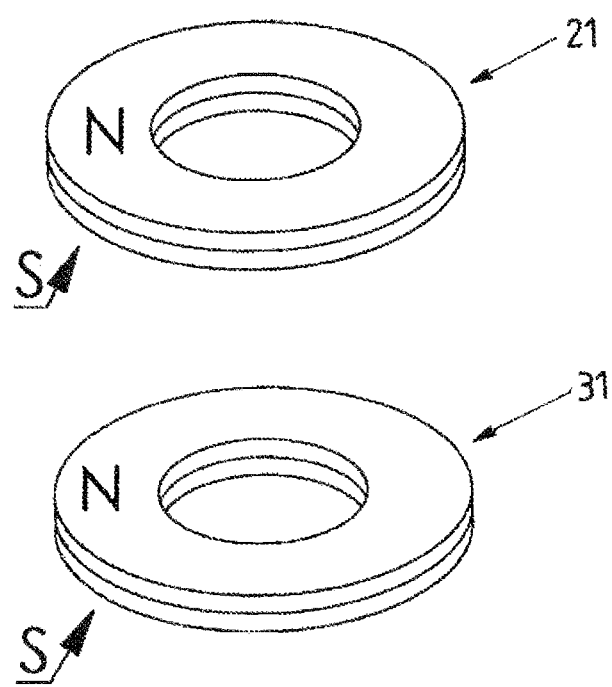
FIG. 12 shows a view of yet another exemplary embodiment of magnetic elements of the connecting device.
Figure 14:
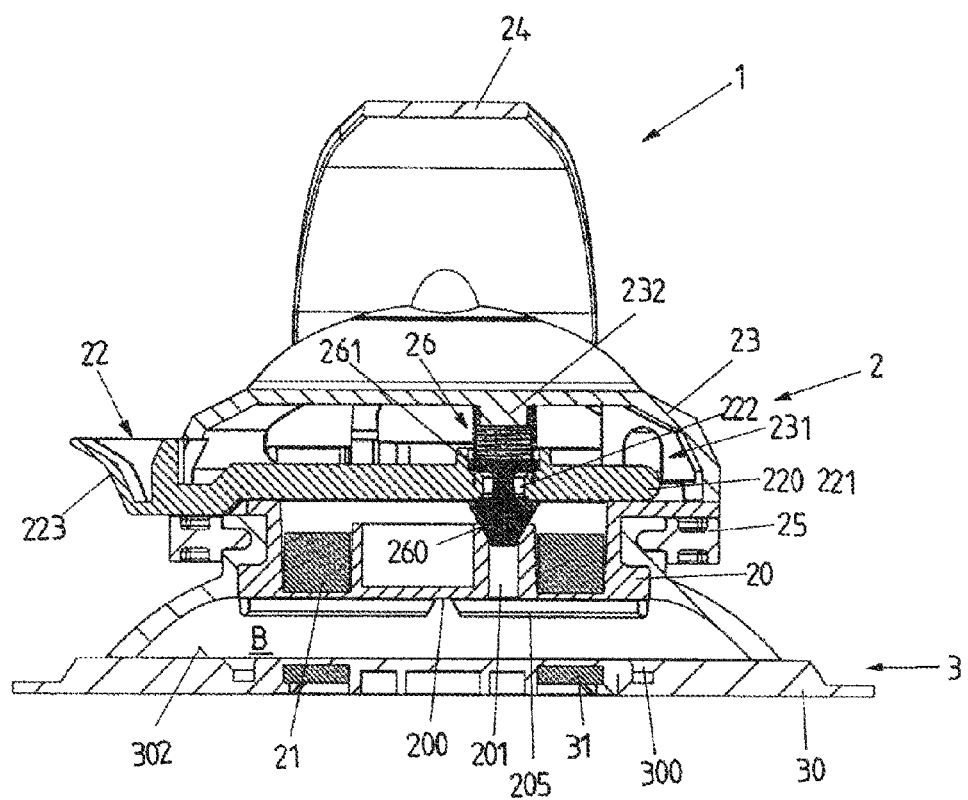
FIG. 14A shows a view of the connecting device when closing.
FIG. 14B shows a plan view of the arrangement according to FIG. 14A.
FIG. 14C shows a sectional view along the line A-A according to FIG. 14B.

In the example according to FIG. 12, the magnetic elements 21, 31 are in each case configured by annular permanent magnets which by way of unlike poles N, S point toward one another and thus interact in a magnetically attractive manner.

All of the examples according to FIGS. 7 to 12 are practicable and able to be implemented in an advantageous manner. The use of an annular magnetic element 21, 31 as in the example according to FIG. 12 can optionally have the advantage that the closure module 2 and the attachment assembly 3 can be mutually positioned in a simple manner, in particular in a plane that is directed transversely toward an attachment direction A, wherein the magnetic pull of the magnetic elements 21, 31 has the effect that the closure module 2 and the attachment assembly 3 are mutually attracted and correctly mutually positioned in a self-acting manner.

The handling of the connecting device 1 for closing and opening is to be explained hereunder with reference to FIGS. 13A-13C to 18A-18C.

In order for the connecting device 1 to be closed, the closure module 2 and the attachment assembly 3 are attached to one another along an attachment direction A, as can be seen in the transition from FIGS. 13A-13C to FIGS. 15A-15C. The vacuum element 27 here comes to bear on the attachment face 302 on the attachment part 30, while elastically deforming the flexible peripheral portion 272 of the vacuum element 27, as can be seen in particular from FIG. 15C.

When the closure module 2 and the attachment assembly 3 are attached to one another, a form-fitting portion 205 on the base 200 of the housing part 20 of the closure module 2 engages with an assigned form-fitting portion 300 on the attachment part 30 of the attachment assembly 3. The form-fitting portion 205 is formed by an annular web that projects from the base 200 and in the connected position engages in the form-fitting portion 300 in the form of an annular groove on the attachment part 30. As a result of this engagement, transverse forces between the closure module 2 and the attachment part 30 can in particular be absorbed such that the closure module 2 and the attachment assembly 3 are mutually supported in a transverse manner.

Moreover, an exact mutual positioning of the closure module 2 and the attachment assembly 3 while attaching is guaranteed by the form-fitting portions 205, 300.

Figure 15A:
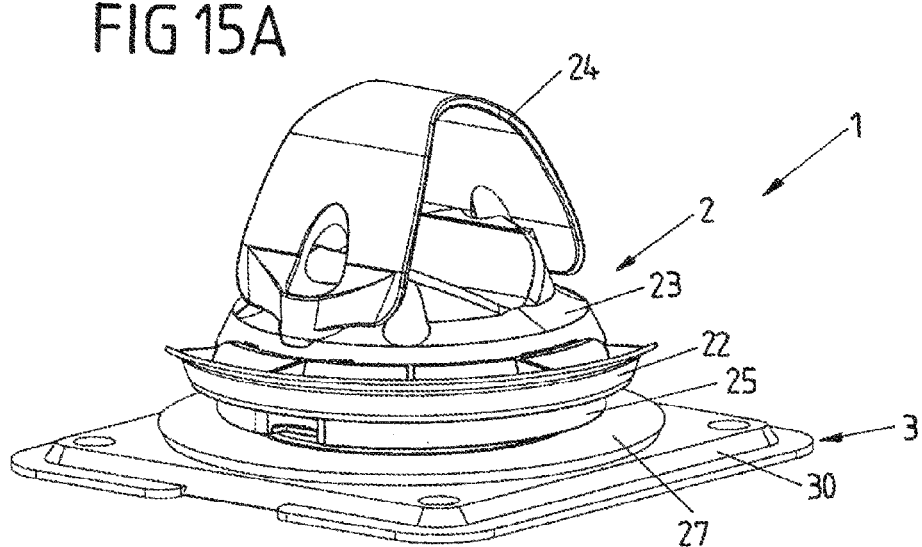
FIG. 15A shows a view of the connecting device in the connected position.
Figure 15B:
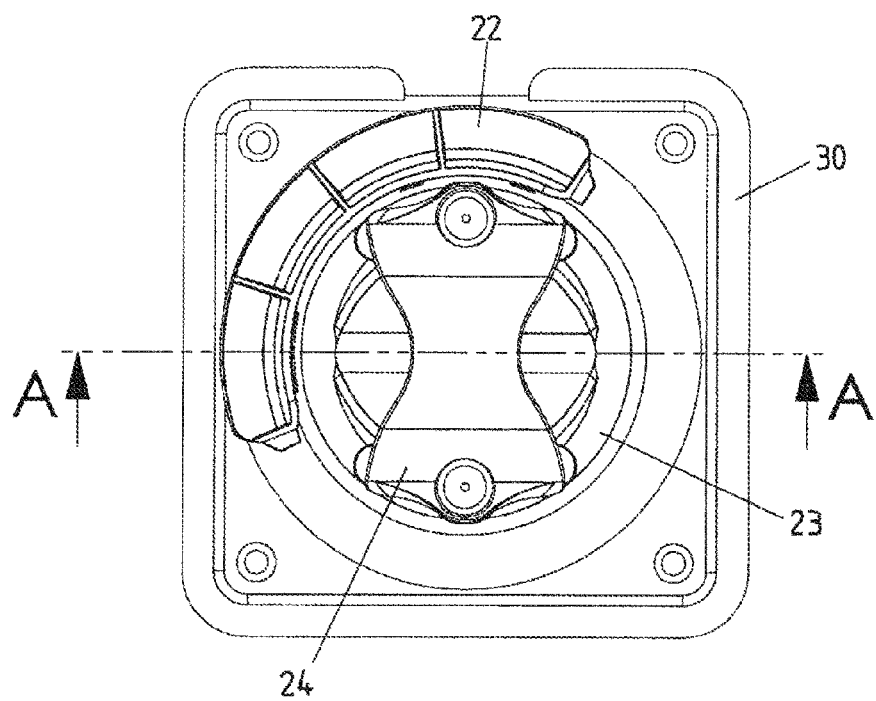
FIG. 15B shows a plan view of the arrangement according to FIG. 15A.
Figure 15C:
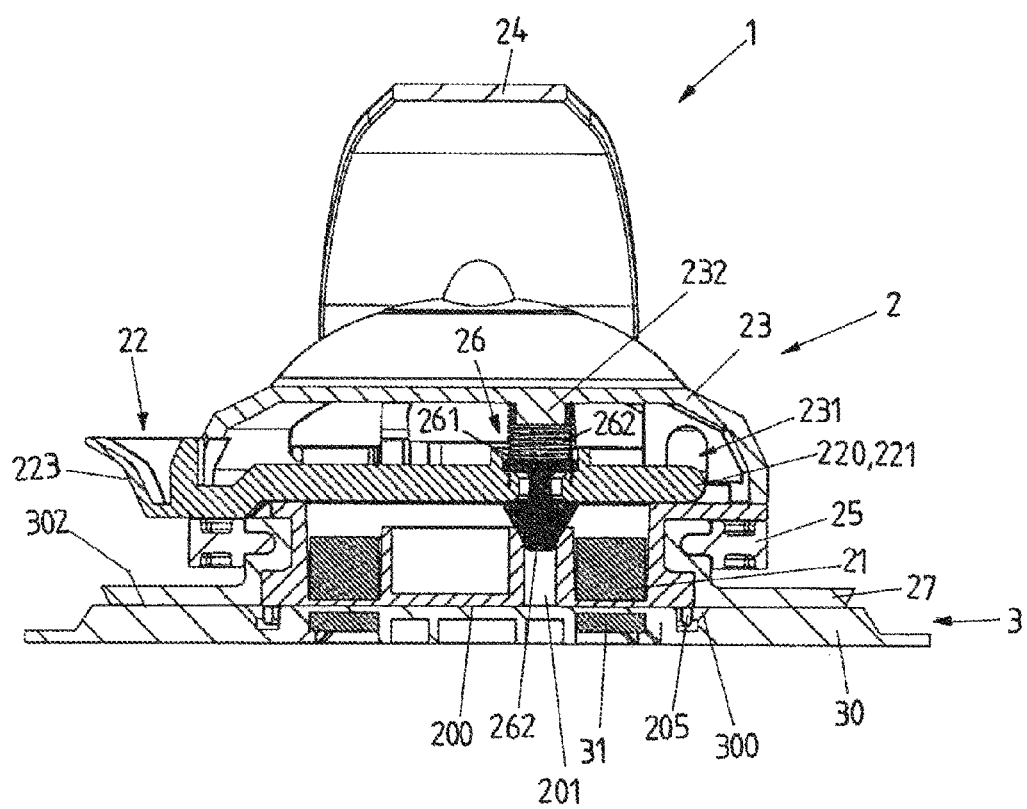
FIG. 15C shows a sectional view along the line A-A according to FIG. 15B.

In the connected position of the connecting device 1, illustrated in FIGS. 15A-15C, a space B between the vacuum element 27 and the attachment part 30 is minimized. As a result, there is a vacuum effect between the vacuum element 27 and the attachment part 30 in addition to a magnetic pull between the magnetic elements 21, 31 which in the connected position are directly opposite one another and thus interact in a magnetically attractive manner in order for the closure module 2 and the attachment part 30 to be held.

As can be seen from FIG. 15C, the valve element 26 in the closed position by way of the valve head 262 closes the flow opening 201 in the base of the housing part 20 such that no air can flow into a space between the closure element 27 and the attachment part 30. The closure module 2 and the attachment assembly 3 are thus held together in a secure and reliable manner, wherein stresses from impacts can in particular also be reliably received and absorbed as a result of the vacuum effect.

Figure 16A:
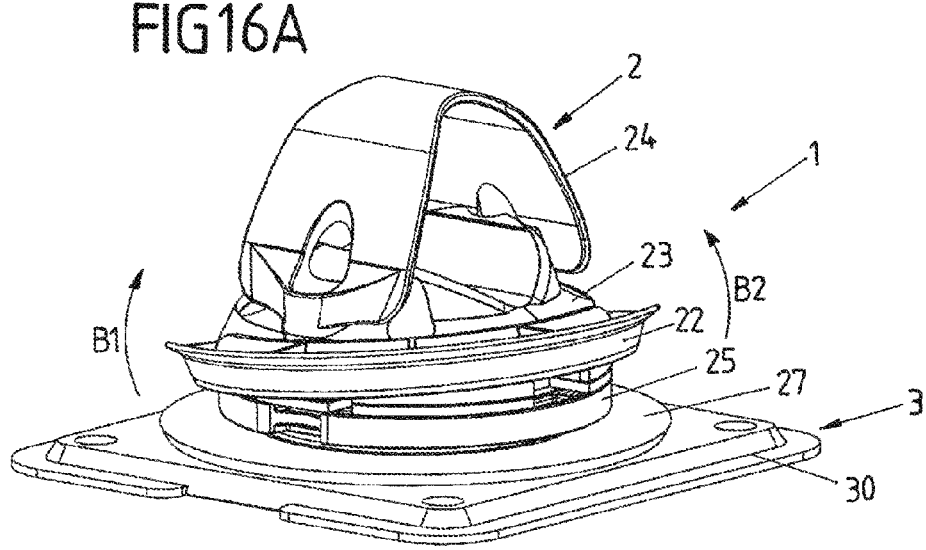
FIG. 16A shows a view of the connecting device when opening.
Figure 16B:
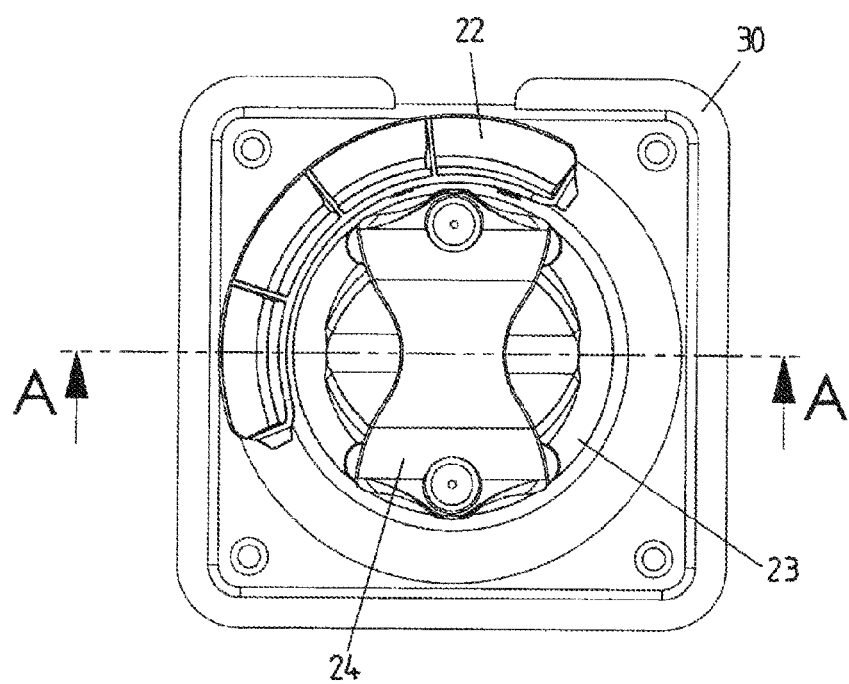
FIG. 16B shows a plan view of the arrangement according to FIG. 16A.
Figure 16C:
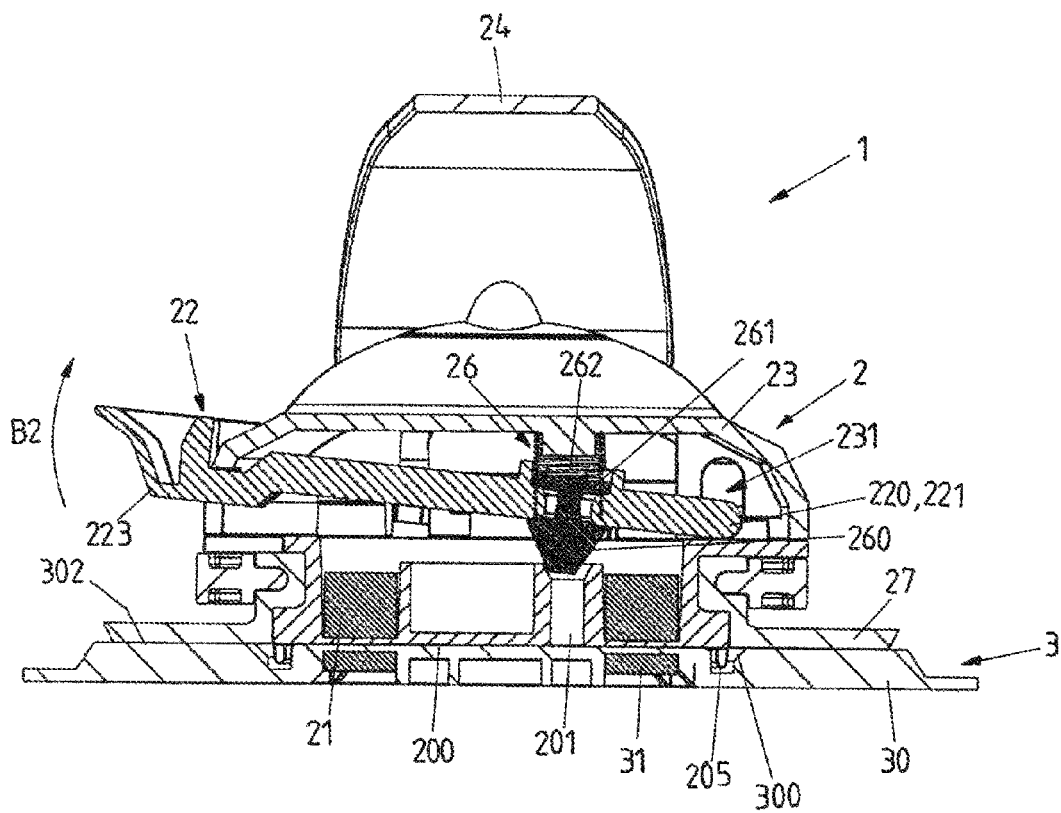
FIG. 16C shows a sectional view along the line A-A according to FIG. 16B.

In order for the connecting device 1 to be opened, the adjustment element 22 can be pivoted about different spatial directions in relation to the housing assembly formed by the housing parts 20, 23, as can be seen from FIGS. 16A-16C. Such tilting by means of a tilting movement B1, B2 can be effected about one of the tilting axes K1, K2 or about a combination of the tilting axes K1, K2, for example by engaging centrically on the activation portion 223 of the adjustment element 22.

Figure 17A:
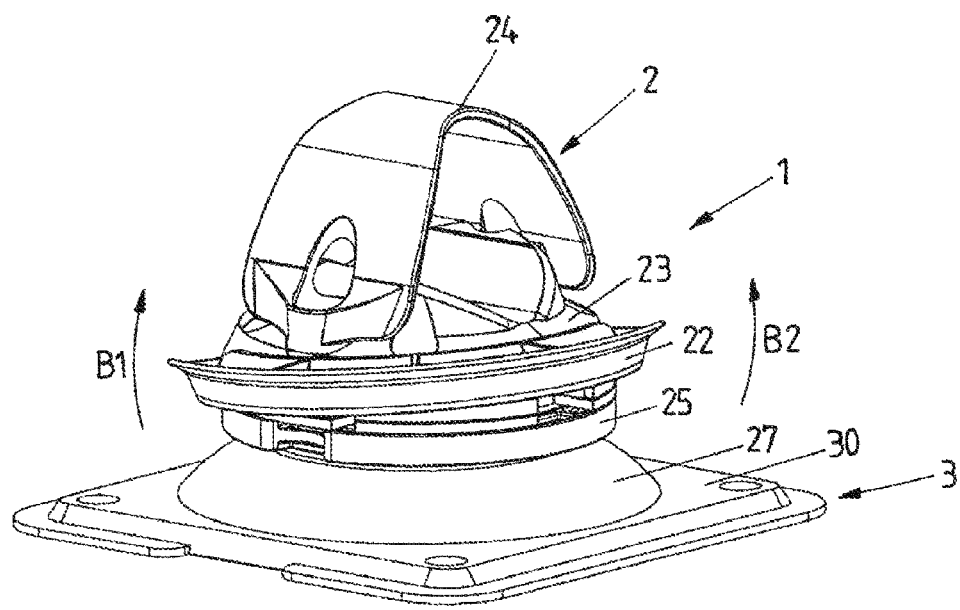
FIG. 17A shows a view of the connecting device when further opening.
Figure 17B:
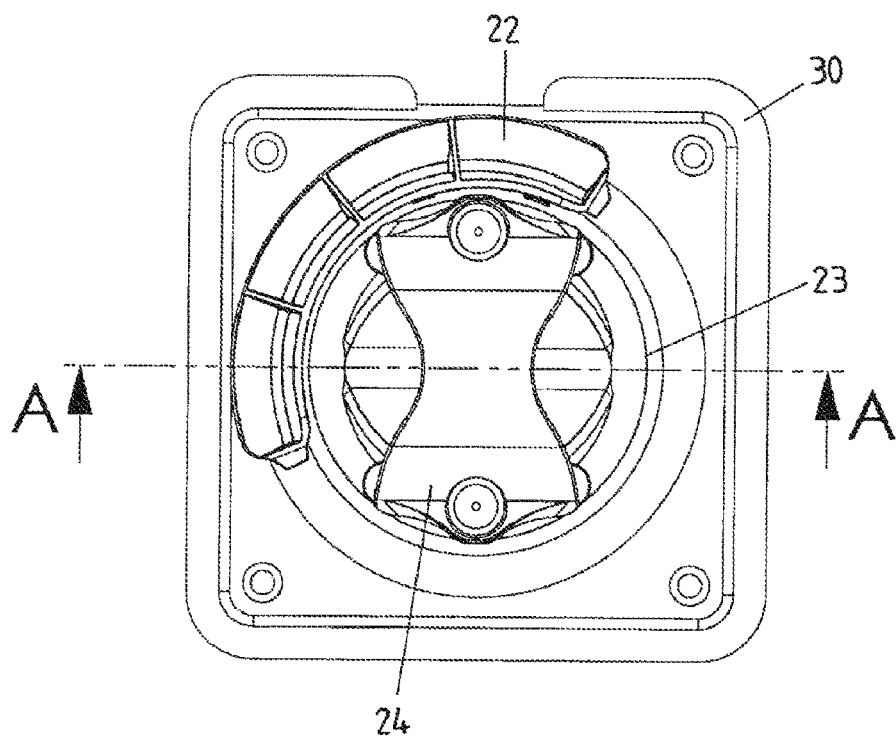
FIG. 17B shows a plan view of the arrangement according to FIG. 17A.
Figure 17C:
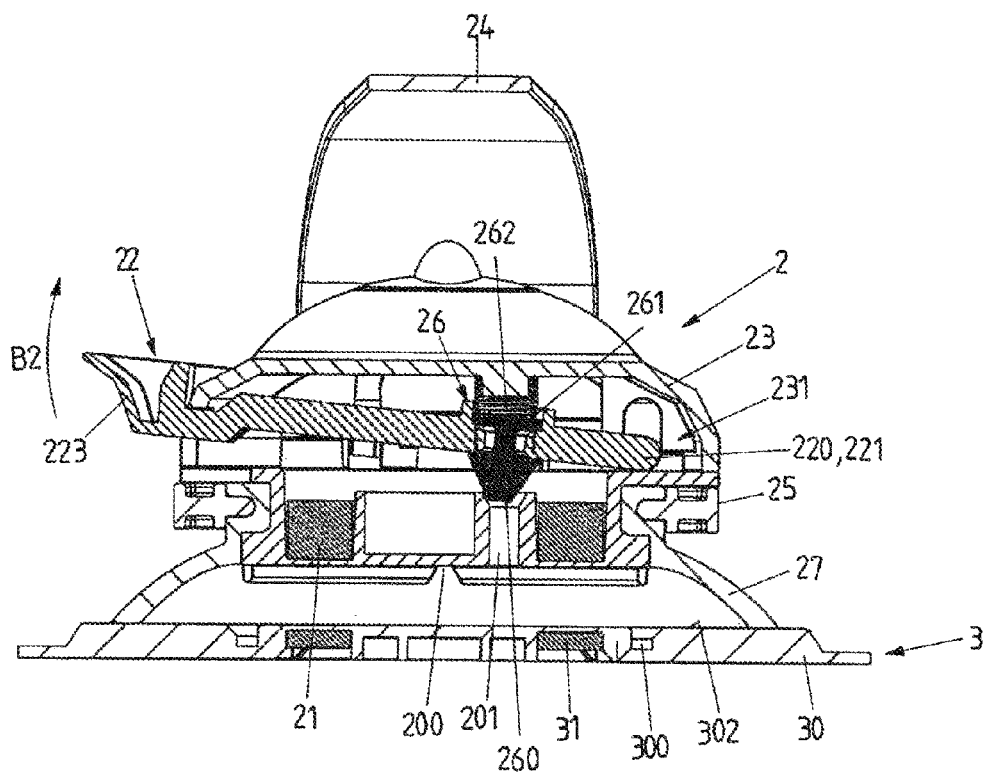
FIG. 17C shows a sectional view along the line A-A according to FIG. 17B.

As can be seen from FIG. 16C, the valve element 26 is entrained by tilting the adjustment element 22, and the valve head 260 is moved toward the flow opening 201 such that the flow opening 201 is partially exposed and air can thus flow into a space B between the vacuum element 27 and the attachment part 30, as can be seen from the transition from FIGS. 16A-16C toward FIGS. 17A-17C. The space B is thus enlarged, and a vacuum effect between the vacuum element 27 and the attachment part 30 is cancelled such that the closure module 2 and the attachment assembly 3 can be released from one another in a simple manner.

Figure 18A:
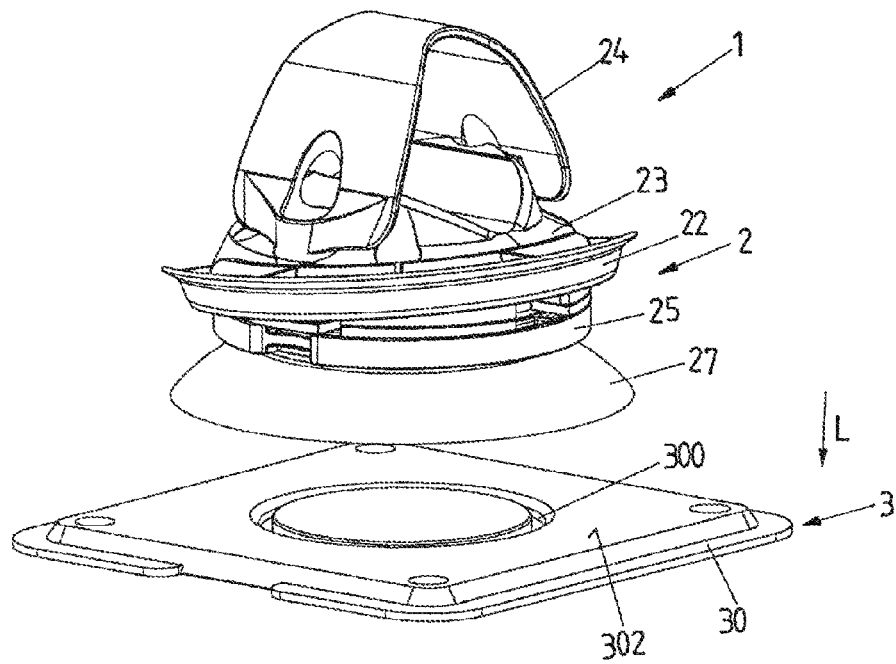
FIG. 18A shows a view of the connecting device in the opened position.
Figure 18B:
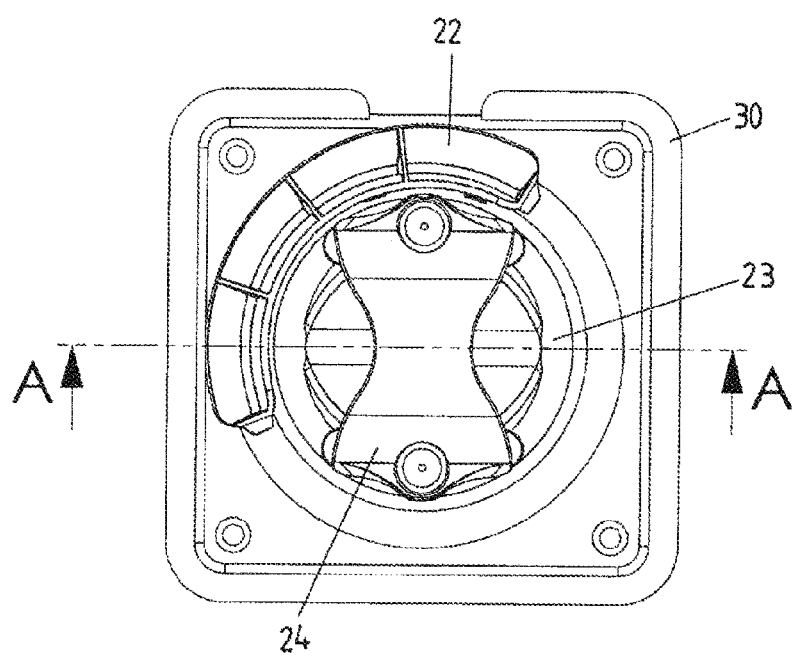
FIG. 18B shows a plan view of the arrangement according to FIG. 18A.
Figure 18C:
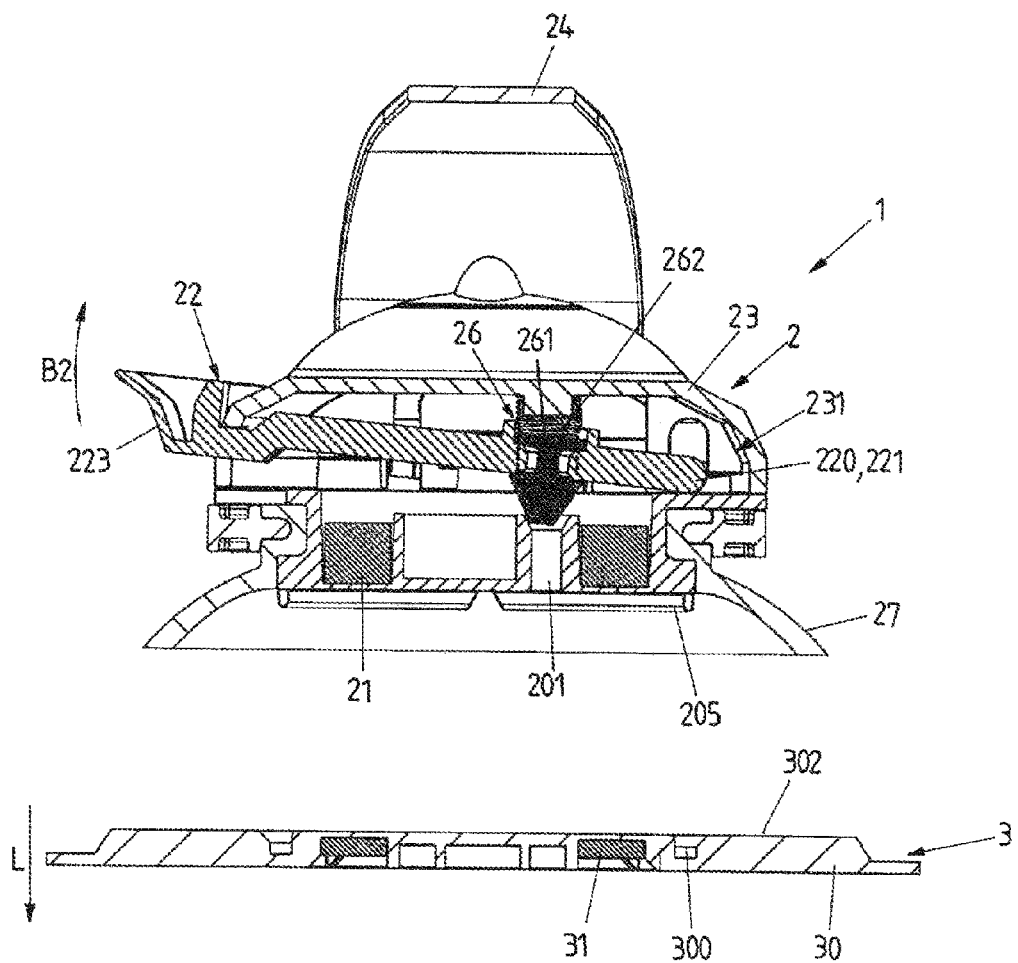
FIG. 18C shows a sectional view along the line A-A according to FIG. 18B.

The removal of the attachment assembly 3 from the closure module 2 can take place in a release direction L, as can be seen in FIGS. 18A-18C. The releasing action in the release direction L takes place counter to an activation direction of the adjustment element 22, this designing the activation of the adjustment element 22 and the subsequent removal of the attachment assembly 3 from the closure module 2 by a user to be simple and comfortable, in particular so as to release an electronic apparatus from an assigned assembly, for example from the handlebar of a bicycle, for example.

Upon completion of the activation of the adjustment element 22, a user can let go of the adjustment element 22, as a result of which the adjustment element 22 by virtue of the spring preloading of the spring element 262 makes its way back in a self-acting manner to the initial position of said adjustment element 22, the flow opening 201 in said initial position being closed by the valve element 26, corresponding to the position according to FIGS. 13A-13C.

In the previously described exemplary embodiment of the connecting device 1, the adjustment element 22 is able to be tilted about tilting axes K1, K2 in relation to a housing assembly formed by the housing parts 20, 23. Such a tilting-capable bearing can generally be provided by a tumbling bearing of the adjustment element 22 on an assigned housing part 20, as is illustrated in FIGS. 19A-19C to FIGS. 22A-22C. Such a tumbling bearing is to be understood that the bearing enables tilting about different spatial directions and enables a combined tilting movement, thus does not provide any defined pivoting bearing about a defined pivot axis.

The adjustment element 22 by way of a curved bearing face 228 can thus be mounted on a complementary bearing face 206 of the housing part 20, as is the case in the generalizing example according to FIGS. 19A-19C to FIGS. 22A-22C, such that a movement of the adjustment element 22 along the curved faces 206, 228 in relation to the latter is possible. In this way, openings 227 on the adjustment element 22 can be brought to be congruent with a flow opening 201 on the housing part 20, as can be seen from FIGS. 20A-20C to FIGS. 22A-22C, so as to in this way open a flow path and enable air to flow into a space between a vacuum element and an assigned attachment part.

Tilting of the adjustment element 22 about different spatial directions, corresponding to tilting axes K1, K2, in relation to the assigned housing part 20 is also possible in the generalizing example according to FIGS. 19A-19C to FIGS. 22A-22C, wherein tilting in this case is enabled by way of a friction bearing by way of the curved bearing faces 206, 228.

Figure 24A:
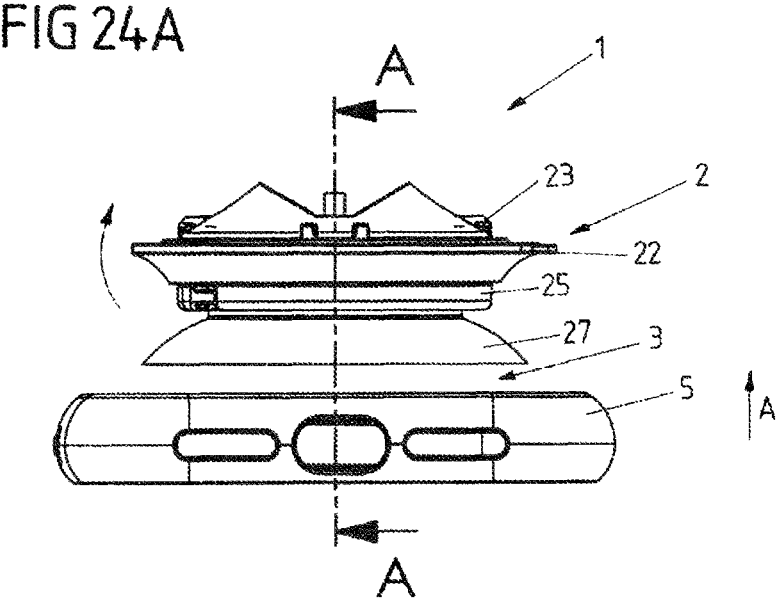
FIG. 24A shows a lateral view of the connecting device conjointly with an assigned assembly.
Figure 24B:
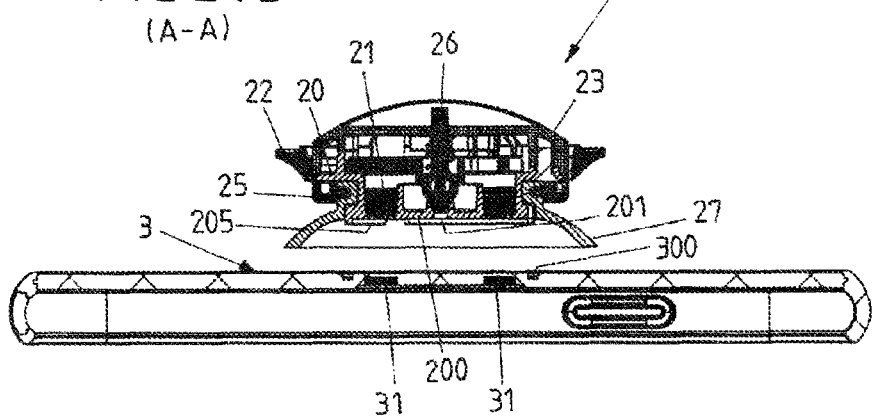
FIG. 24B shows a sectional view along the line A-A according to FIG. 24A.

In an exemplary embodiment illustrated in FIGS. 23 to 34, a connecting device 1 has a closure module 2 which can be attached to an attachment assembly 3 on an assigned assembly 5, as is illustrated in FIGS. 24A, 24B for example.

In a manner analogous to that described previously, for example in the context of the exemplary embodiment according to FIGS. 1 to 6, the closure module 2 has a housing assembly which is formed by housing parts 20, 23 which are fixedly connected to one another, for example screwed to one another. An adjustment element 22 is mounted on the housing assembly, said adjustment element 22 being partially encased between the housing parts 20, 23 and to this end by way of webs 226 extending through clearances 235 in the housing part 23 and moreover being supported on bearing points 209A-209C on the housing part 20.

A vacuum element 27 is connected to the housing part 20 by way of a fastening ring 25 in the form of a clamping ring. The vacuum element 27 by way of a flexible peripheral portion 272 can be attached to the attachment assembly 3 of the assembly 5 and in the attached position is held on the attachment assembly 3 under the effect of a vacuum. The vacuum element 27 by way of a collar 270 is fixedly connected to the housing part 20 as a result of the clamping effect of the fastening ring 25, wherein the housing part 20 lies in an opening 271 of the vacuum element 27 and by way of a base 200 faces the attachment assembly 3 when the closure module 2 and the attachment assembly 3 are attached to one another, as is derived from FIGS. 24A and 24B for example.

A valve element 26, which by way of a valve head 260 points toward the base 200 of the housing part 20 and in a non-activated position of the adjustment element 22 closes a flow opening 201 in the base 200 such that air cannot invade a space between the vacuum element 27 and the attachment assembly 3 when the closure module 2 is attached to the attachment assembly 3, is disposed on the adjustment element 22, in a manner analogous to that previously described.

The valve element 26 lies in a central receptacle opening 222 on the adjustment element 22 and by way of a coupling portion 263 is coupled to the adjustment element 22 such that the valve element 26, when adjusting the adjustment element 22, is moved conjointly with the adjustment element 22 and as a result is moved from the closing engagement of said valve element 26 with the flow opening 201. The flow opening 201 in the base 200 of the housing part 20 can thus be exposed by adjusting the adjustment element 22 such that the vacuum effect between the closure module 2 and the attachment assembly 3 can be cancelled in order for the attachment assembly 3 to be released from the closure module 2.

The valve element 26 is supported in relation to the housing part 23 in a spring-elastic manner by way of a spring element 262. The spring element 262 thus preloads the valve element 26 in the direction of the adjustment element 22, wherein an adjustment of the adjustment element 22 also takes place counter to the spring-elastic effect of the spring element 262, and the adjustment element 22 upon activation, by virtue of the spring effect, is reset to the non-activated position corresponding to the position according to FIGS. 24A, 24B.

A magnetic element 21 in the form of an annular permanent magnet is received in a receptacle space 203 on the housing part 20. Moreover, the attachment assembly 3 also has a magnetic element 31 in the form of an annular permanent magnet, as can be seen from FIG. 24B. The magnetic elements 21, 31 when attaching the closure module 2 and the attachment assembly 3 to one another interact in a magnetically attractive manner so as to deform the vacuum element 27 and, as a result, to cause a vacuum between the vacuum element 27 and the attachment assembly 3.

As can be seen from FIG. 24B, the attachment assembly 3 has a form-fitting portion 300 in the form of a groove into which the closure module 2 by way of a form-fitting portion 205 on the base 200 of the housing part 20 can be inserted so as to position the closure module 2 and the attachment assembly 3 on one another and, in addition to the vacuum effect and to the magnetic pull by way of the magnetic elements 21, 31, provide support in particular in relation to shear forces transverse to the attachment direction A.

The attachment assembly 3 can be integrated in the assembly 5, for example in the form of an electric apparatus or a case of such an apparatus, for example a mobile phone case. In this case, the magnetic element 31 is integrated in the assembly 5, and the form-fitting portion 300 is molded in the assembly 5, for example the mobile phone case.

The closure module 2 can be fastened to an assigned assembly 4, for example a bicycle handlebar, by way of a fastening bracket 24 which can be fixedly connected to the housing part 23 of the housing assembly.

Figure 25:
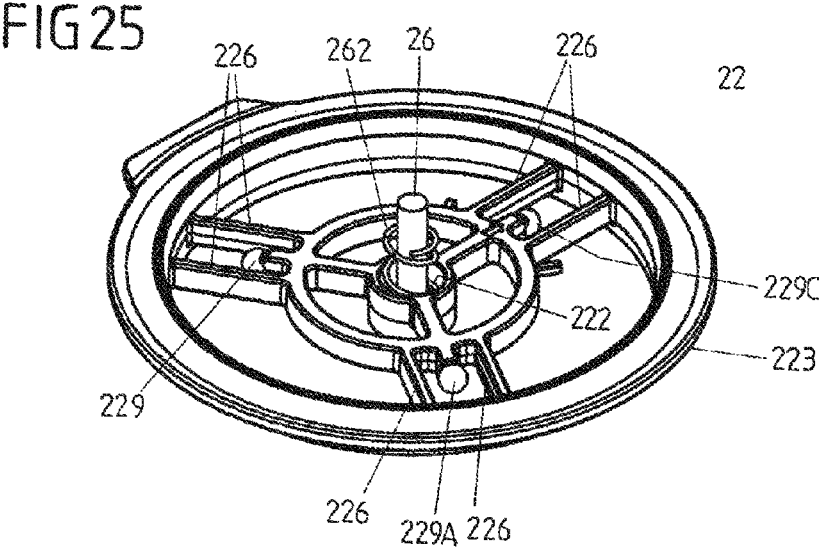
FIG. 25 shows a view of an adjustment element of a closure module of the connecting device.
Figure 26A:
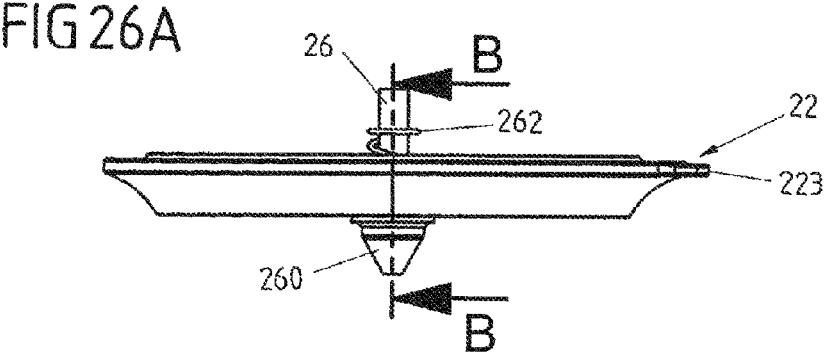
FIG. 26A shows a lateral view of the adjustment element.
Figure 26B:
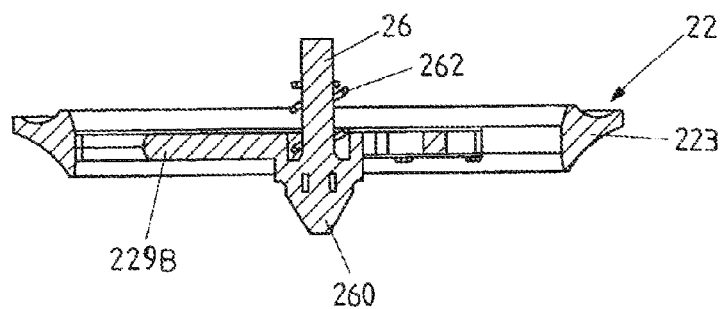
FIG. 26B shows a sectional view along the line B-B according to FIG. 26A.

In the exemplary embodiment according to FIGS. 23 to 34, the bearing of the adjustment element 22 on the housing assembly takes place by bearing journals 229A, 229B, 229C which on the radially outer ends thereof are spherically shaped and are in each case disposed between two radially extending webs 226 of the adjustment element 22, as can be seen from FIG. 25 for example. Each bearing journal 229A, 229B, 229C on an assigned bearing point 209A, 209B, 209C of the housing part 20 is supported in such a manner that each bearing journal 229A, 229B, 229C is able to be tilted at the assigned bearing point 209A, 209B, 209C as well as displaceable longitudinally along an adjustment direction which is directed perpendicular to the plane of the housing part 20.

Figure 33:
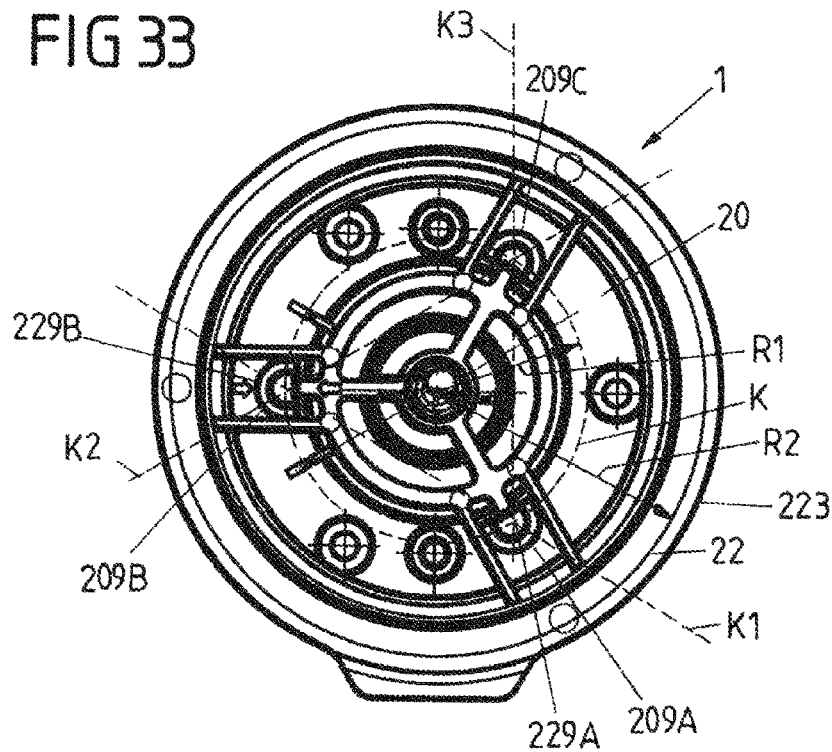
FIG. 33 shows a view of the adjustment element on the housing assembly, illustrating the arrangement of bearing points of the housing assembly along a circle.

As is schematically plotted in FIG. 33, the bearing points 209A, 209B, 209C are lined up next to one another along a circle K and disposed herein so as to be uniformly distributed along the circle K. The bearing journals 229A, 229B, 229C engage in the bearing points 209A, 209B, 209C, which are molded in the manner of clamshells extending perpendicularly to the plane of the circle K, in such a manner that the spherical bearing journals 229A, 229B, 229C are able to be tilted at the bearing points 209A, 209B, 209C and moreover displaceable perpendicular to the plane of the circle K at the bearing points 209A, 209B, 209C.

It is achieved as a result that the adjustment element 22 is able to be tilted about entirely arbitrary tilting axes K1, K2, K3 in relation to the housing part 20, specifically about arbitrary tilting axes within the plane of the circle K.

Figure 27:
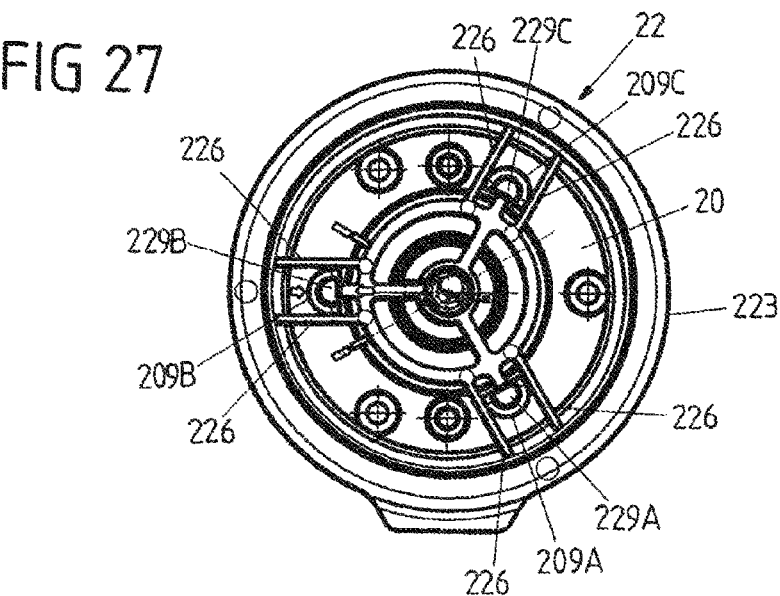
FIG. 27 shows a plan view of the adjustment element of the closure module that is disposed on a housing assembly.
Figure 28A:
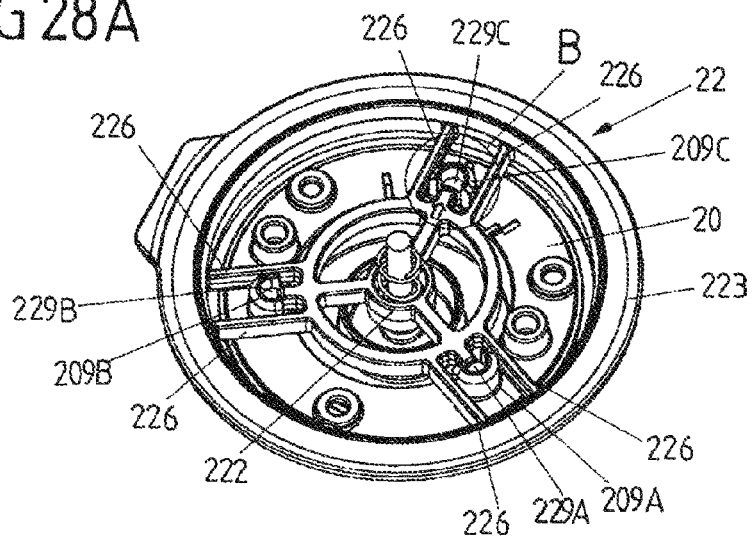
FIG. 28A shows a perspective view of the adjustment element on the housing assembly.
Figure 28B:
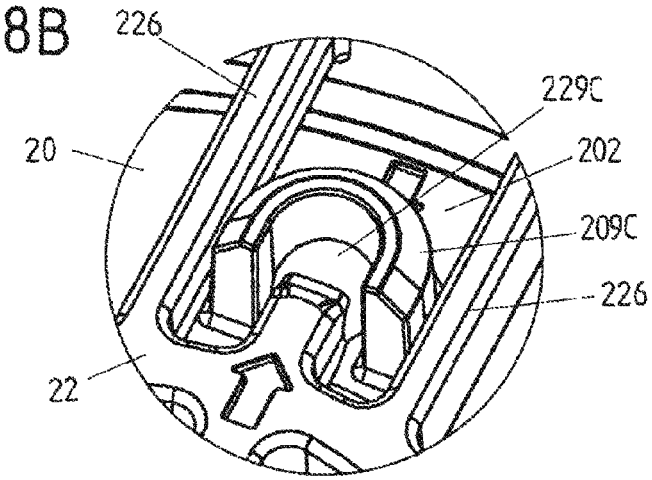
FIG. 28B shows an enlarged view in the fragment B according to FIG. 28A.
Figure 30A:
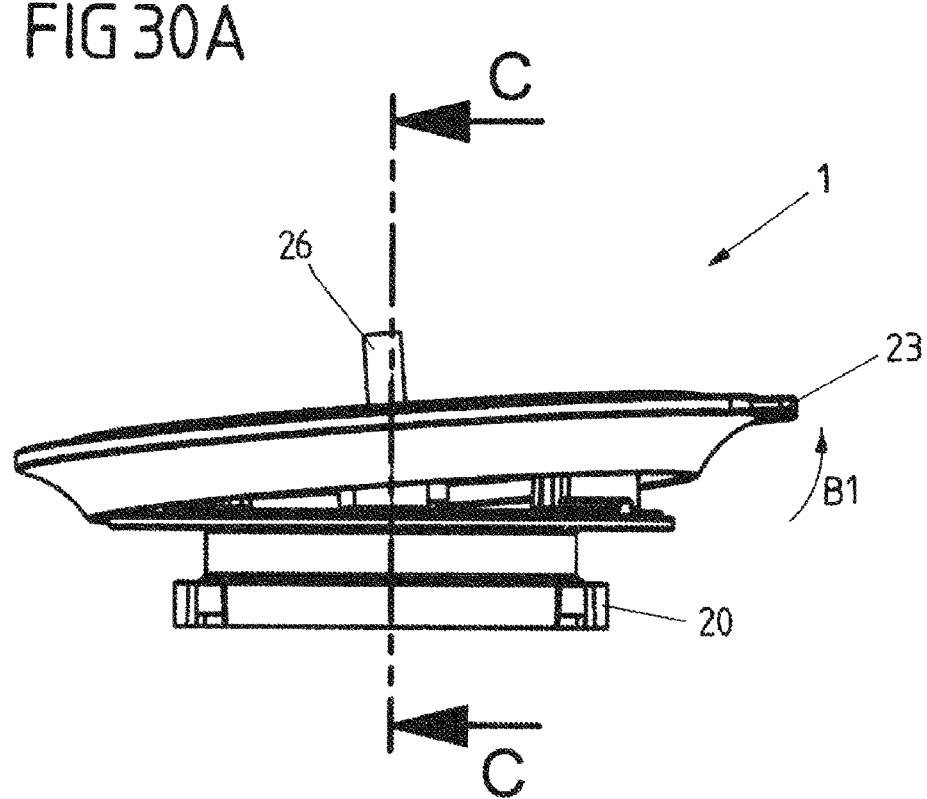
FIG. 30A shows a view of the adjustment element when activated along a first activation direction.
Figure 30B:
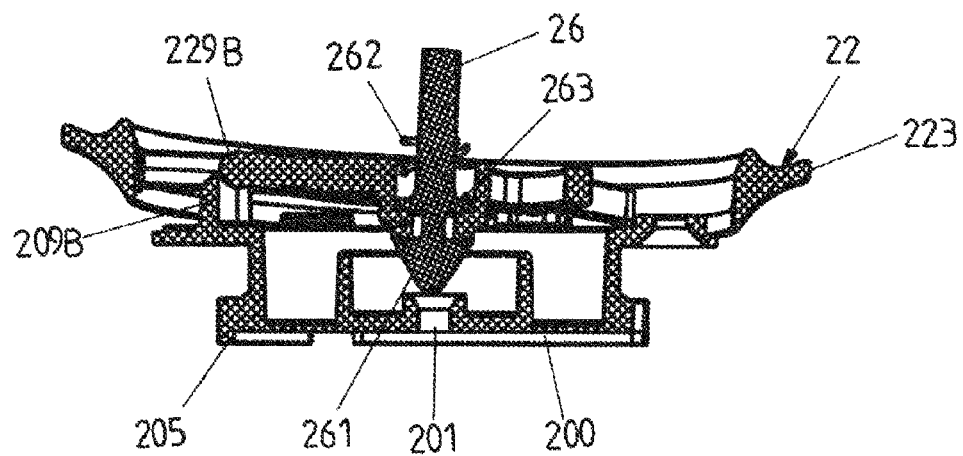
FIG. 30B shows a sectional view along the line C-C according to FIG. 30A.
Figure 31A:
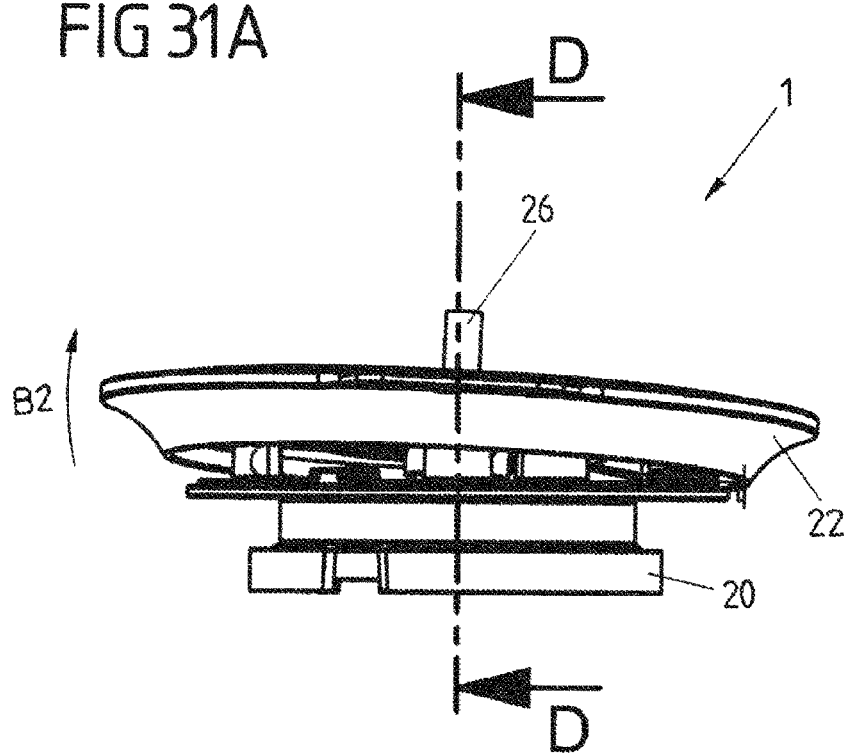
FIG. 31A shows a view of the adjustment element when activated along a second activation direction.
Figure 31B:
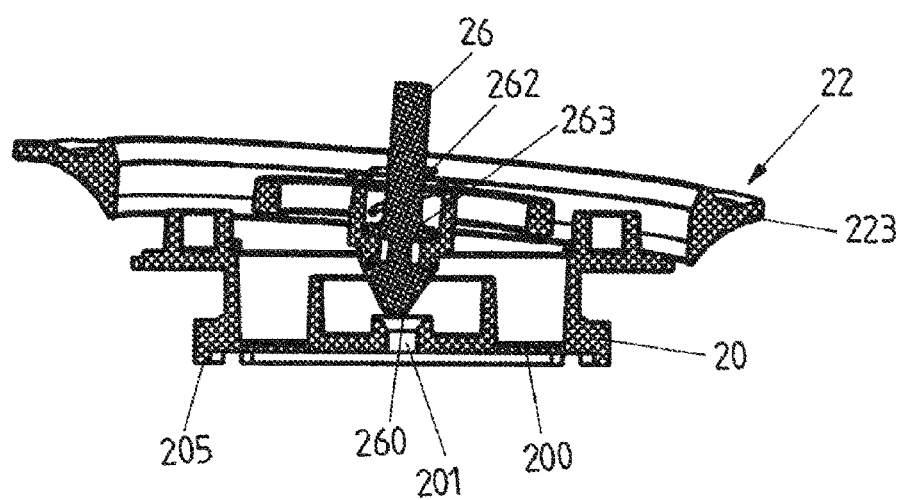
FIG. 31B shows a sectional view along the line C-C according to FIG. 31A.
Figure 32A:
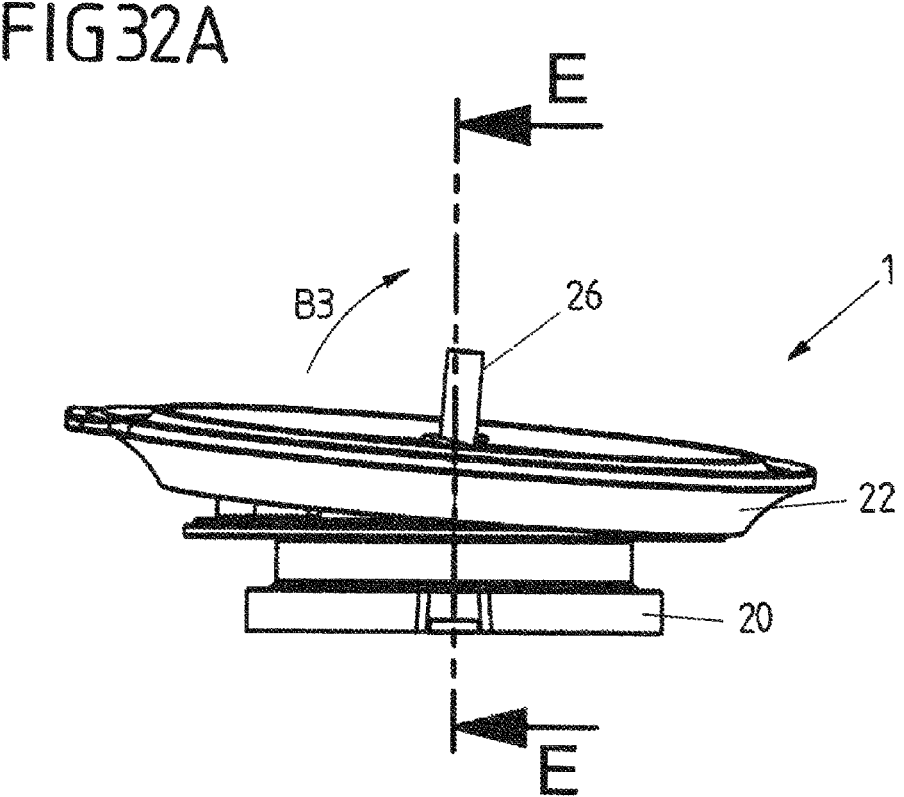
FIG. 32A shows a view of the adjustment element when activated along a third activation direction.
Figure 32B:
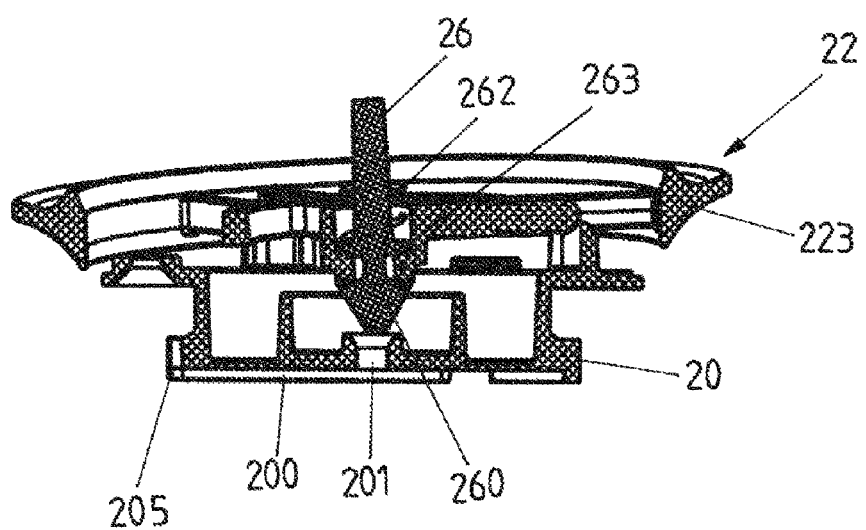
FIG. 32B shows a sectional view along the line C-C according to FIG. 32A.

As can be seen from FIG. 27 and FIGS. 28A, 28B when viewed in combination with FIGS. 29A to 29C, the bearing journals 229A, 229B, 229C in a non-activated position of the adjustment element 22 lie in the bearing points 209A, 209B, 209C such that the bearing journals 229A, 229B, 229C bear on a side of the flange 202 of the housing part 20 that faces away from the vacuum element 27 and by way of said side are supported perpendicularly to the plane of the circle K on the housing part 20 (see in particular the enlarged view according to FIG. 29C). In this non-activated position, the valve element 26 closes the flow opening 201 in the base 200 of the housing part 20 such that there is a vacuum effect between the attachment assembly 3 and the closure module 2 when the closure module 2 is connected to the attachment assembly 3.

The adjustment element 22 can be activated by way of an activation portion 223 which extends circumferentially on the adjustment element 22 and is closed in an annular manner. The activation portion 223 here is disposed radially outside the circle K, as can be seen from FIG. 33, in that the activation portion 223 has a radius R2 which is larger than the radius R1 of the circle K.

The adjustment element 22 can in particular be activated in that a user acts on the activation portion 223 from the direction of the attachment assembly 3, and adjusts the activation portion 223 in relation to the housing assembly along an activation direction B1, B2, B3, as plotted in FIGS. 30A, 30B to 32A, 32B. In such an adjustment of the adjustment element 22, the adjustment element 22 is tilted in relation to the housing assembly in that one or two of the bearing journals 229A, 229B, 229C at the respective bearing points 209A, 209B, 209C of the housing part 20 are supported perpendicularly to the plane of the circle K on the flange 202, and at least one of the bearing journals 229A, 229B, 229C is adjusted perpendicularly to the plane of the circle K at the respective assigned bearing point 209A, 209B, 209C, while being raised from the flange 202 of the housing part 20, as can be seen from FIG. 30B pertaining to the bearing journal 229B, for example.

When an activation of the adjustment element 22 on the activation portion 223 takes place at a circumferential location of a bearing journal 229A, 229B, 229C, the adjustment element 22 is thus tilted about tilting axis K1-K3 which is defined by the other two bearing journals 229A, 229B, 229C. When the adjustment element 22 is activated at the circumferential location of the bearing journal 229A, for example, the adjustment element 22 thus tilts about a tilting axis K2 in relation to the housing part 20, said tilting axis K2 being defined by the other two bearing journals 229A, 229B, 229C in that the bearing journals 229A, 229B, 229C are supported perpendicularly to the plane of the circle K on the flange 202, and the bearing journal 229A at the bearing point 209A is raised from the flange 202.

An activation here is possible at any arbitrary circumferential location of the activation portion 223. Tilting here does not necessarily take place about a tilting axis K1-K3 that is defined by two bearing journals 229A, 229B, 229C but can take place about any arbitrary tilting axis within the plane of the circle K, for example also while the adjustment element 22 is supported on the flange 202 of the housing part 20 only by way of one bearing journal 229A, 229B, 229C.

Figure 34:
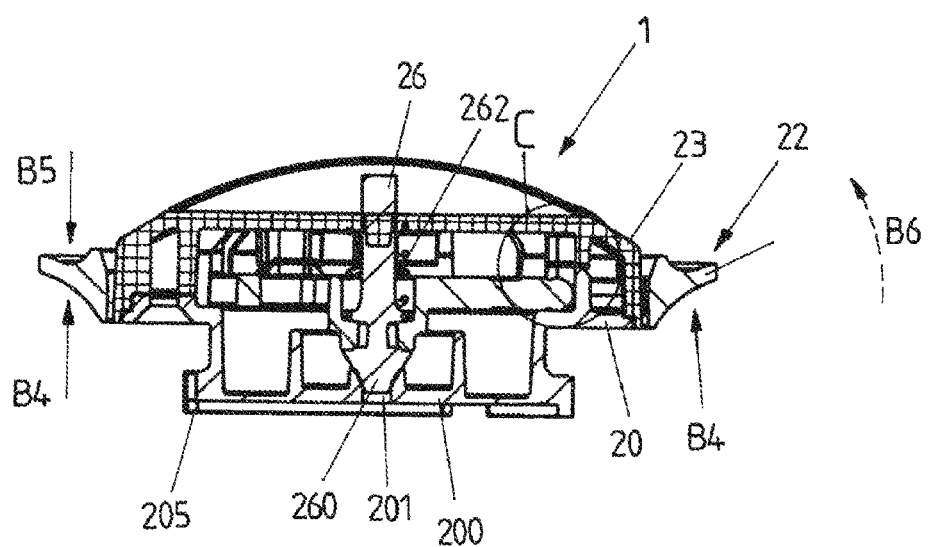
FIG. 34 shows the sectional view according to FIG. 29B, illustrating the tilting capability of the adjustment element relative to the housing assembly along different activation directions.

The adjustment element 22 here, by virtue of the bearing, cannot only be activated by tilting, but can also be displaced in an activation direction B4 perpendicular to the plane of the circle K, as is plotted in FIG. 34, and as a result be raised from the housing part 20 so as to move the valve element 26 from the closing engagement of the latter with the flow opening 201 in the base 200 of the housing part 20.

Moreover, an activation is possible not only from the direction of the attachment assembly 3 but can also take place in the opposite activation direction in that a user acts on the activation portion 223 in an activation direction B5 that is directed toward the attachment assembly 3, as is plotted in FIG. 34. In this case, the adjustment element 22 tilts in a tilting direction B6 while supporting those bearing journals 229A, 229B, 229C on the flange 202 that face the point of force introduction.

An activation in the activation direction B5 is possible as a result of the activation portion 223 being disposed radially outside the circle K and thus radially outside the bearing by way of the bearing points 209A, 209B, 209C. A leverage for the activation here can be set by way of the radii R1, R2 of the circle K assigned to the bearing points 209A, 209B, 209C and of the activation portion 223, such that an activation in an activation direction B5 directed toward the attachment assembly 3 is also enabled.

The concept on which the solution is based is not limited to the exemplary embodiments outlined above, but can in principle also be implemented in an entirely different manner.

In particular, entirely different elements which interact for providing vacuum forces are conceivable and possible. To this extent, the embodiments outlined above are to be understood as being merely exemplary A connecting device of the type described here can serve for fastening entirely different assemblies to one another. In particular, the connecting device in terms of the use thereof is not limited to the examples shown here. The connecting device can be advantageously used for fastening electronic apparatuses, for example a camera or a mobile phone. This is however not limiting.

A plurality of flow openings can also be disposed on the housing assembly, at least one of said flow openings being exposed wherein the adjustment element is adjusted. Each flow opening here can be assigned a dedicated valve element which is connected to the adjustment element.

LIST OF REFERENCE SIGNS

1 Connecting device
2 Closure module
20 Housing part
200 Base
201 Flow opening
202 Flange
203 Receptacle space
204 Raised portion
205 Form-fitting portion
206 Bearing face
207, 208 Bearing point
209A-C Bearing point
21 Magnetic element
22 Adjustment element
220, 221 Bearing journal
222 Receptacle opening
223 Activation portion
224 Exit
225 Connecting portion
226 Webs
227 Inlet opening
228 Bearing face
229A-C Bearing journal
23 Housing part
230, 231 Bearing point
232 Support portion
233, 234 Opening
235 Clearances
24 Fastening bracket
25 Fastening ring (clamping ring)
26 Valve element
260 Valve head
261 Foot
262 Spring element
263 Coupling portion
27 Vacuum element (cup element)
270 Collar
271 Opening
272 Flexible peripheral portion
3 Attachment assembly 30 Attachment part
300 Form-fitting portion
301 Receptacle opening
302 Attachment face
31 Magnetic element
4 Assembly
5 Assembly
A Attachment direction
B Space
B1-B6 Activation direction
K Circle
K1-K3 Tilting axis
L Release direction
R1, R2 Radius

The invention claimed is:

1. A connecting device for releasably connecting two assemblies, comprising
a closure module configured to be provided on a first of the assemblies, and has a housing assembly, an adjustment element disposed so as to be adjustable on the housing assembly, and a vacuum element; and
an attachment assembly configured to be provided on a second of the assemblies, wherein the vacuum element is connectable to the attachment assembly along an attachment direction and in a connected position interacts with the attachment assembly in such a manner that the vacuum element and the attachment assembly, when the closure module and the attachment assembly are stressed relative to one another, are held together by virtue of a vacuum effect between the vacuum element and the attachment assembly,
wherein the adjustment element for releasing the vacuum element from the attachment assembly is able to be tilted about different spatial directions in relation to the housing assembly so as to expose a flow opening in the housing assembly to an inflow of air into a space present between the vacuum element and the attachment assembly,
wherein the closure module has a first magnetic element, and the attachment assembly has a second magnetic element, wherein the first magnetic element and the second magnetic element in the connected position are opposite one another in a magnetically attractive manner,
wherein the housing assembly has at least one bearing point for bearing the adjustment element,
wherein the adjustment element has a plurality of bearing journals, and the housing assembly has a plurality of bearing points, wherein the bearing journals are in each case received in one bearing point of the housing assembly, and each of the bearing journals is able to be tilted in the assigned bearing point and is moreover able to be moved along an activation direction along which the adjustment element is adjustable on the housing assembly,
wherein the bearing points are lined up next to one another along a circle on the housing assembly, and
wherein the adjustment element has an activation portion for activating the adjustment element by a user, wherein the activation portion has a radius which is larger than a radius of the circle.

2. The connecting device as claimed in claim 1, wherein the adjustment element in the connected position of the connecting device is configured to be at a first position relative to the housing assembly, and for releasing the vacuum element from the attachment assembly is adjustable from the first position so as to expose the flow opening.

3. The connecting device as claimed in claim 2, wherein the adjustment element in relation to the housing assembly is preloaded to the first position.

4. The connecting device as claimed in claim 1, wherein the vacuum element is configured by a cup element which is elastic at least in portions, wherein the attachment assembly has an attachment part which configures an attachment face by way of which the vacuum element is connectable.

5. The connecting device as claimed in claim 1, wherein the housing assembly has a first housing part and a second housing part which therebetween receive the adjustment element.

6. The connecting device as claimed in claim 1, wherein the adjustment element has at least one bearing journal which is received in the at least one bearing point, wherein the at least one bearing journal in the at least one bearing point is able to be tilted about a first tilting axis and a second tilting axis.

7. The connecting device as claimed in claim 1, wherein the flow opening is disposed so as to be concentric with the circle on the housing assembly.

8. The connecting device as claimed in claim 1, wherein the activation portion extends circumferentially on the adjustment element.

9. The connecting device as claimed in claim 1, wherein the at least one bearing point is configured by a slot.

10. The connecting device as claimed in claim 1, wherein the flow opening is formed in a base of the housing assembly, said base in the connected position facing the attachment assembly.

11. The connecting device as claimed in claim 1, wherein the closure module has a valve element which is disposed on the adjustment element and is able to be activated by adjusting the adjustment element.

12. The connecting device as claimed in claim 11, wherein the valve element has a valve head which in the connected position seals the flow opening in a fluidically tight manner.

13. A connecting device for releasably connecting two assemblies, comprising
a closure module configured to be provided on a first of the assemblies, and has a housing assembly, an adjustment element disposed so as to be adjustable on the housing assembly, and a vacuum element; and
an attachment assembly configured to be provided on a second of the assemblies, wherein the vacuum element is connectable to the attachment assembly along an attachment direction and in a connected position interacts with the attachment assembly in such a manner that the vacuum element and the attachment assembly, when the closure module and the attachment assembly are stressed relative to one another, are held together by virtue of a vacuum effect between the vacuum element and the attachment assembly,
wherein the adjustment element for releasing the vacuum element from the attachment assembly is able to be tilted about different spatial directions in relation to the housing assembly so as to expose a flow opening in the housing assembly to an inflow of air into a space present between the vacuum element and the attachment assembly,
wherein the closure module has a first magnetic element, and the attachment assembly has a second magnetic element, wherein the first magnetic element and the second magnetic element in the connected position are opposite one another in a magnetically attractive manner, and wherein the housing assembly of the closure module has a first form-fitting portion, and the attachment assembly has a second form-fitting portion, wherein the first form-fitting portion and the second form-fitting portion when attaching the closure module and the attachment assembly to one another mutually engage in a positive locking manner for blocking a transverse movement between the closure module and the attachment assembly.

14. The connecting device as claimed in claim 1, wherein at least one of the first magnetic element and the second magnetic element is formed by an annular permanent magnet.

15. An electronic apparatus having a connecting device as claimed in claim 1 for connecting the electronic apparatus to an assigned assembly.

16. The electronic apparatus as claimed in claim 15, wherein the electronic apparatus is a camera or a mobile phone.

* * * * *